US012597565B2

(12) United States Patent
Fukuda et al.

(10) Patent No.: US 12,597,565 B2
(45) Date of Patent: Apr. 7, 2026

(54) MULTILAYER ELECTRONIC COMPONENT

(71) Applicant: KYOCERA Corporation, Kyoto (JP)

(72) Inventors: Daisuke Fukuda, Kirishima (JP); Daiki Tsurubayashi, Kirishima (JP); Tatsuya Suzuki, Kirishima (JP)

(73) Assignee: KYOCERA CORPORATION, Kyoto (JP)

( * ) Notice: Subject to any disclaimer, the term of this patent is extended or adjusted under 35 U.S.C. 154(b) by 0 days.

(21) Appl. No.: 19/230,194

(22) Filed: Jun. 6, 2025

(65) Prior Publication Data

US 2025/0372305 A1 Dec. 4, 2025

Related U.S. Application Data

(63) Continuation-in-part of application No. PCT/JP2025/008354, filed on Mar. 7, 2025.

(30) Foreign Application Priority Data

May 30, 2024 (JP) ................................. 2024-088359

(51) Int. Cl.
*H01G 4/232* (2006.01)
*H01G 4/012* (2006.01)
*H01G 4/30* (2006.01)

(52) U.S. Cl.
CPC ........... *H01G 4/2325* (2013.01); *H01G 4/012* (2013.01); *H01G 4/30* (2013.01)

(58) Field of Classification Search
CPC ......... H01G 4/012; H01G 4/2325; H01G 4/30
See application file for complete search history.

(56) References Cited

U.S. PATENT DOCUMENTS

2013/0062994 A1 3/2013 Ogawa et al.
2014/0293503 A1 10/2014 Sasabayashi et al.
2021/0327649 A1* 10/2021 Muramatsu .............. H01G 4/30
2023/0268132 A1 8/2023 Takei et al.

FOREIGN PATENT DOCUMENTS

JP 2012-199353 A 10/2012
JP 2014-212298 A 11/2014
JP 2023-122205 A 9/2023

* cited by examiner

*Primary Examiner* — Nathan Milakovich
(74) *Attorney, Agent, or Firm* — Volpe Koenig

(57) ABSTRACT

A multilayer electronic component includes a multilayer body including stacked inner electrodes and dielectric layers, underlying electrodes, and outer electrodes. The inner electrodes include a first inner electrode and a second inner electrode, the underlying electrodes include a first underlying electrode and a second underlying electrode, and the outer electrodes include a first outer electrode and a second outer electrode. Each of the first outer electrode and the second outer electrode includes a first portion connected to the first inner electrode or the second inner electrode and a second portion connected to one of the underlying electrodes. An average particle diameter of metal particles contained in the first portion is smaller than an average particle diameter of metal particles contained in the second portion.

16 Claims, 12 Drawing Sheets

MULTILAYER ELECTRONIC COMPONENT

CROSS REFERENCE TO RELATED APPLICATIONS

This application is a continuation in part of PCT International Application No. PCT/JP2025/008354, filed on Mar. 7, 2025, which claims priority to Japanese Application No. 2024-088359, filed on May 30, 2024, the entire contents of which are hereby incorporated by reference.

BACKGROUND OF THE INVENTION

1. Field of the Invention

The present disclosure relates to a multilayer electronic component.

2. Description of the Related Art

A multilayer ceramic capacitor, which is an example of a multilayer electronic component, includes a multilayer body including multiple inner electrodes and multiple dielectric layers alternately stacked and outer electrodes located on surfaces of the multilayer body. Since the thickness of the outer electrodes can be reduced by forming the outer electrodes by a direct plating method, the size and height of multilayer ceramic capacitors can be reduced without reducing the capacitance (see, for example, Japanese Unexamined Patent Application Publication No. 2014-212298).

SUMMARY OF THE INVENTION

In the present disclosure, a multilayer electronic component includes a multilayer body, multiple underlying electrodes, and multiple outer electrodes. The multilayer body includes multiple inner electrodes and multiple dielectric layers alternately stacked, and includes a first surface and a second surface opposed to each other in a stacking direction and a wall surface facing a specified direction intersecting the stacking direction. The multiple outer electrodes comprise a first outer electrode extending from the wall surface at least onto the first surface. The first outer electrode includes a first portion connected to an inner electrode exposed on the wall surface, out of the multiple inner electrodes and a second portion connected to an underlying electrode located on the first surface, out of the multiple underlying electrodes. An average particle diameter of metal particles contained in the first portion is smaller than an average particle diameter of metal particles contained in the second portion.

DESCRIPTION OF THE PREFERRED EMBODIMENTS

Figure 1:
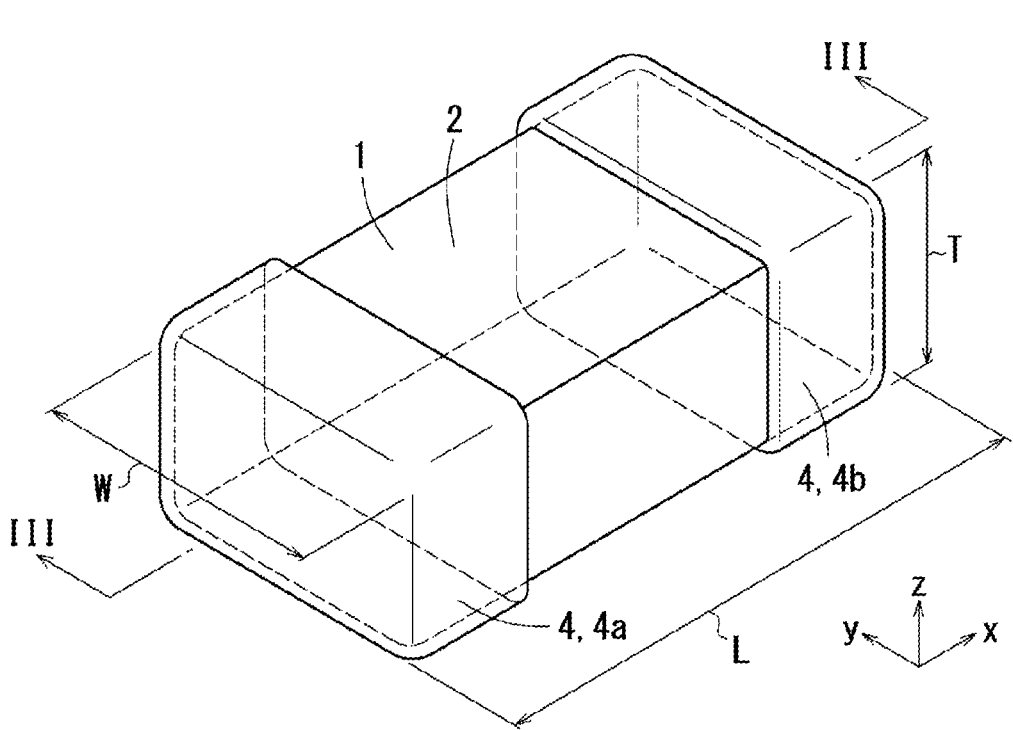
FIG. 1 is a perspective view of a multilayer ceramic capacitor of a first embodiment.

Hereinafter, embodiments of multilayer electronic components according to the present disclosure will be described with reference to the drawings. Although the following describes a multilayer ceramic capacitor as an example of a multilayer electronic component, the multilayer electronic component of the present disclosure is not limited to multilayer ceramic capacitors and is also applicable to various multilayer electronic components such as multilayer piezoelectric elements, multilayer thermistor elements, multilayer chip coils, and ceramic multilayer substrates. The figures used in the following description are schematic. Hence, the ratios of dimensions and the like in the drawings are not necessarily the same as those of the actual ones. In the present specification, a Cartesian coordinate system xyz is defined in some drawings, for convenience. The x-axis direction is also referred to as the longitudinal direction. The y-axis direction is also referred to as the width direction. The z-axis direction is also referred to as the height direction or the stacking direction. In the following, on the assumption that the positive side of the z-axis direction is the upward direction, terms such as an upper surface and a lower surface are used in some cases.

Embodiments described relatively later will be described with a focus on the differences from embodiments relatively earlier. Items not specifically referred to may be considered to be based on the description of embodiments described earlier or may be inferred from the description of embodiments described earlier. In addition, the description of an embodiment may be applied to another embodiment unless a contradiction or the like occurs.

Figure 2:
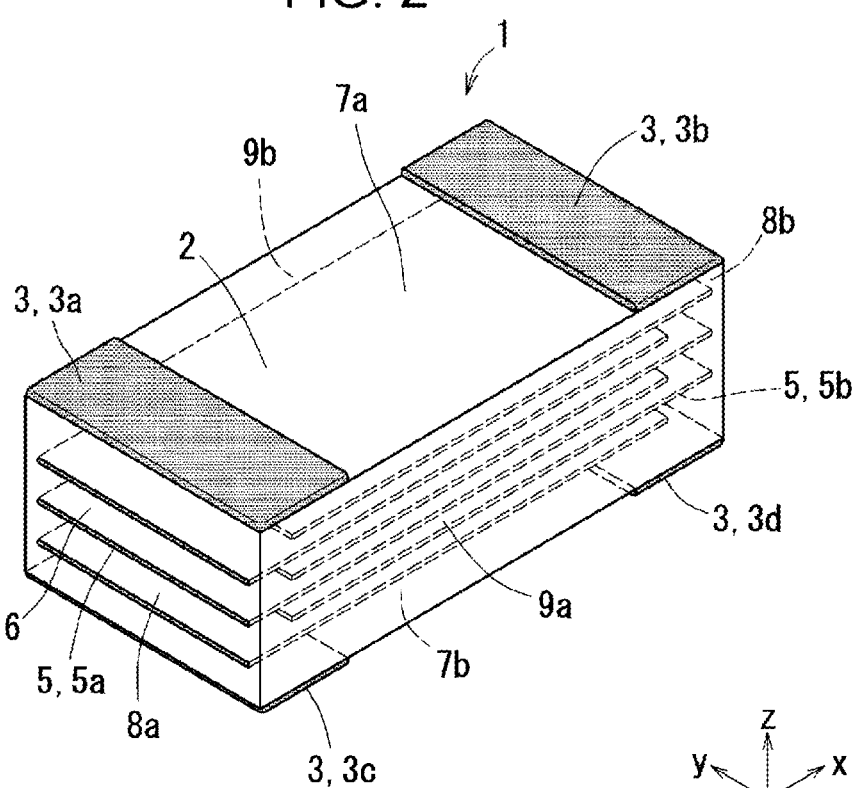
FIG. 2 is a perspective view of a base component of the multilayer ceramic capacitor in FIG. 1.
Figure 3:
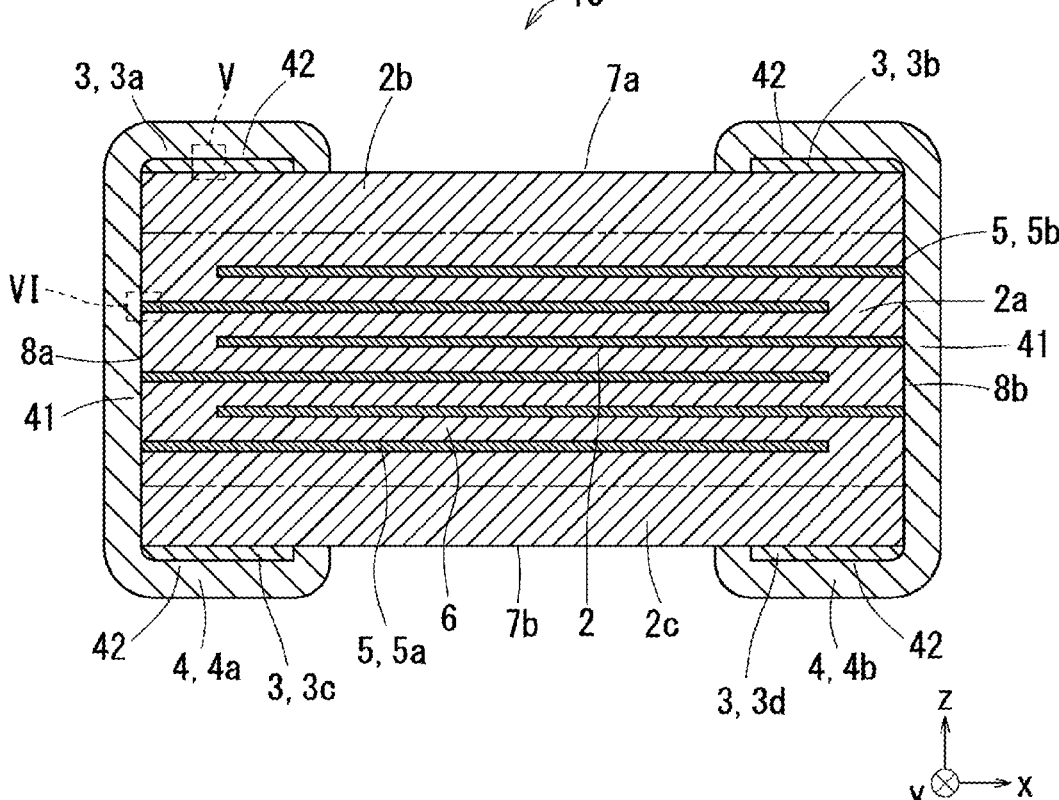
FIG. 3 is a diagram illustrating an example of a cross section taken along cross-section line III-III in FIG. 1.
Figure 4:
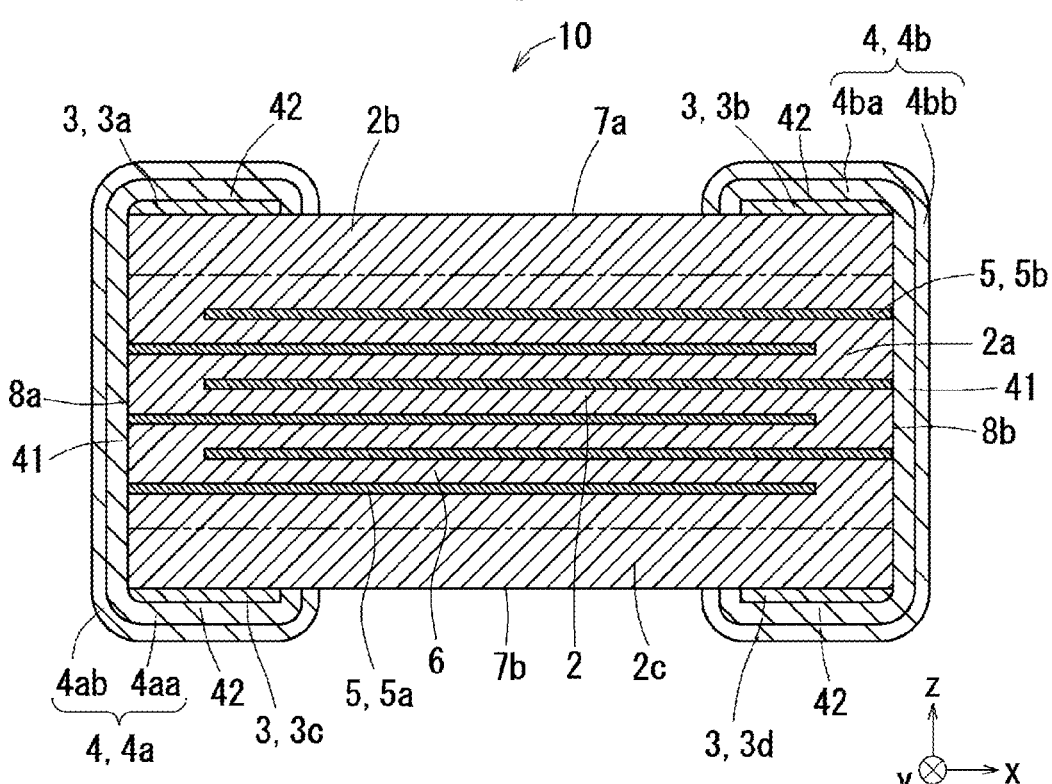
FIG. 4 is a diagram illustrating another example of a cross section taken along cross-section line III-III in FIG. 1.
Figure 5:
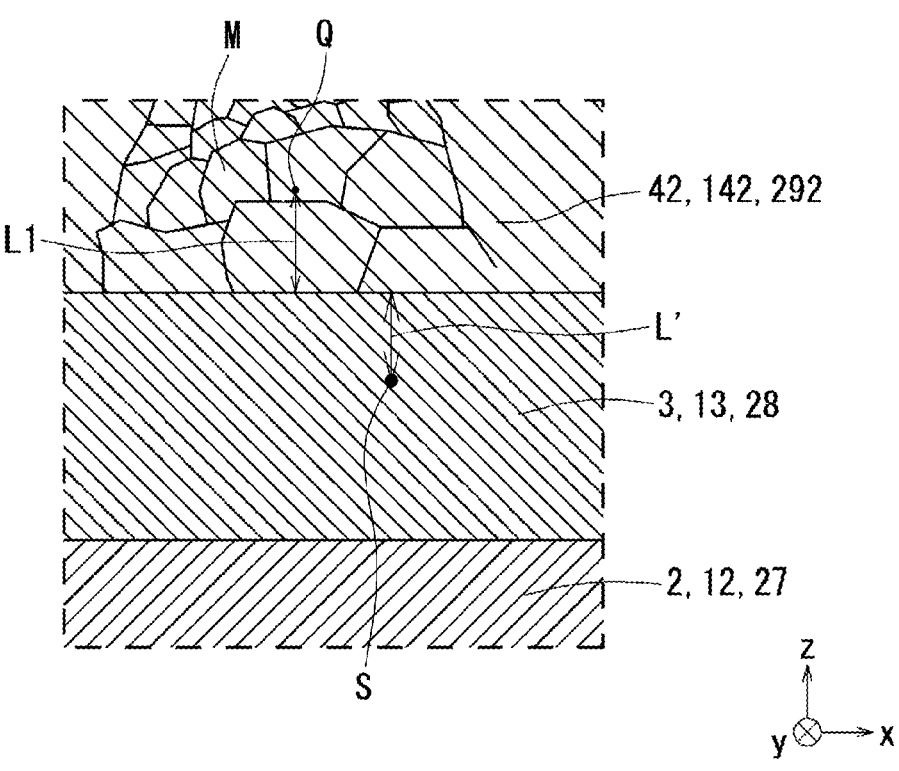
FIG. 5 is an enlarged cross-sectional view of portion V in FIG. 3.
Figure 6:
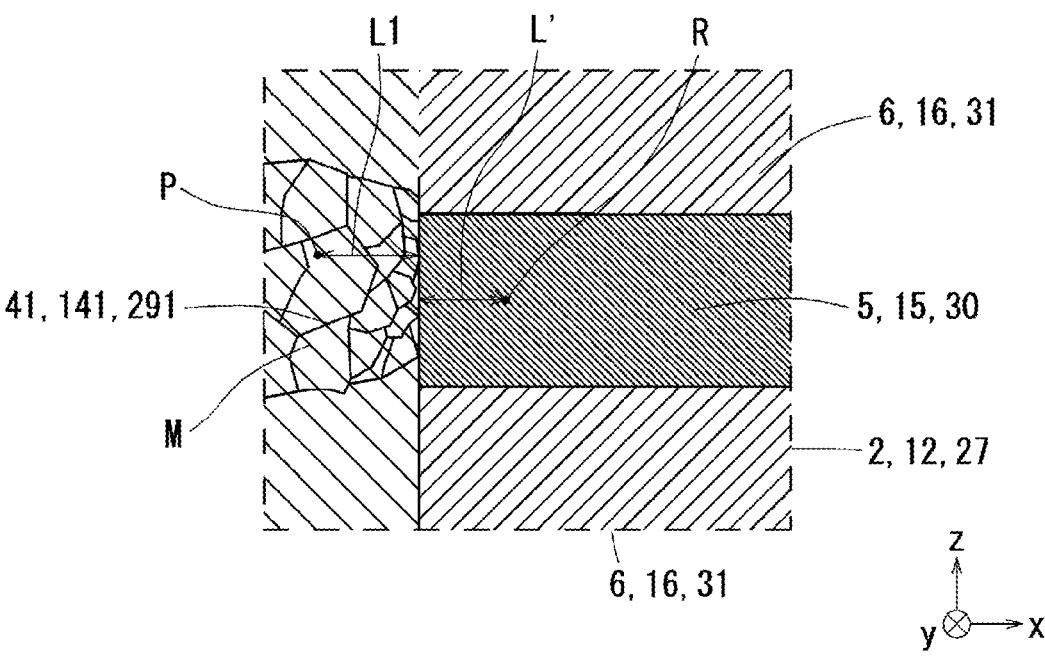
FIG. 6 is an enlarged cross-sectional view of portion VI in FIG. 3.
Figure 7:
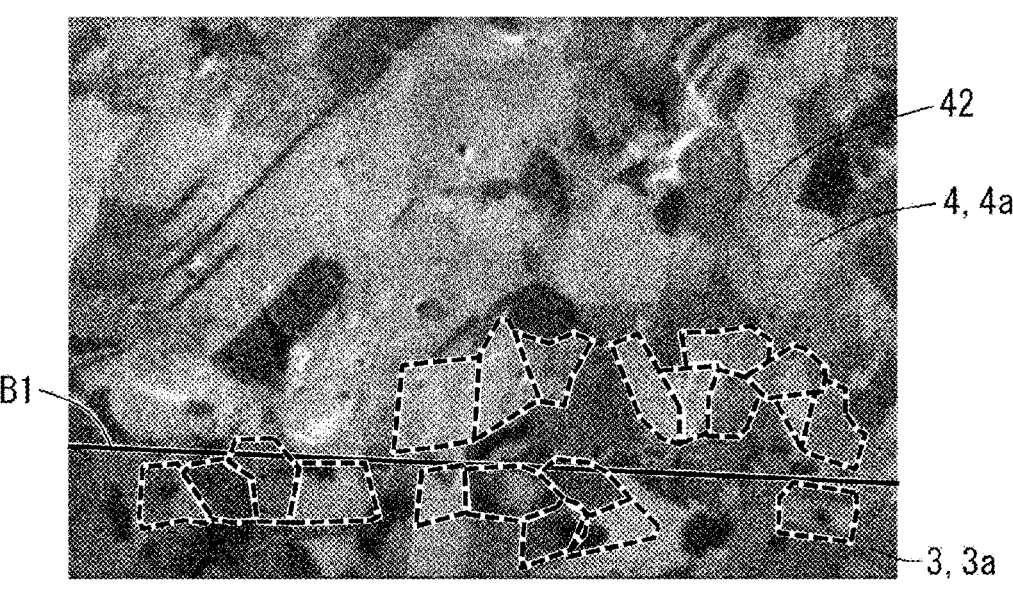
FIG. 7 is an electronic microscope image for explaining the measurement of the particle diameter of metal particles contained in a second portion of an outer electrode and an underlying electrode.
Figure 8:
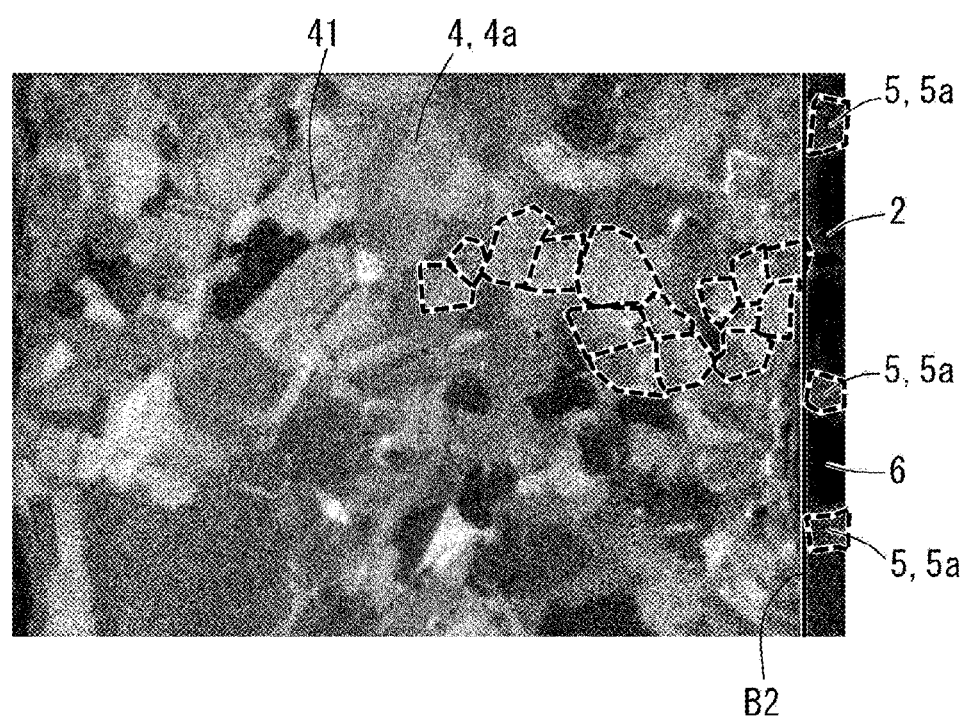
FIG. 8 is an electronic microscope image for explaining the measurement of the particle diameter of metal particles contained in a first portion of an outer electrode and an inner electrode.

FIG. 1 is a perspective view of a multilayer ceramic capacitor of a first embodiment, and FIG. 2 is a perspective view of a base component of the multilayer ceramic capacitor in FIG. 1. FIG. 3 is a diagram illustrating an example of a cross section taken along cross-section line III-III in FIG. 1, and FIG. 4 is a diagram illustrating another example of a cross section taken along cross-section line III-III in FIG. 1. FIG. 5 is an enlarged cross-sectional view of portion V in FIG. 3, and FIG. 6 is an enlarged cross-sectional view of portion VI in FIG. 3. FIG. 7 is an electronic microscope image for explaining the measurement of the particle diameter of metal particles contained in a second portion of an outer electrode and an underlying electrode. FIG. 8 is an electronic microscope image for explaining the measurement of the particle diameter of metal particles contained in a first portion of an outer electrode and an inner electrode. In FIG. 2, underlying electrodes and the end portions of inner electrodes exposed on surfaces of the multilayer body are hatched to makes it easy to understand the illustration. Although FIG. 5 is a diagram illustrating portion V in a cross section of the multilayer ceramic capacitor of the first embodiment, it is also a diagram illustrating a portion corresponding to portion V, in a cross section of multilayer ceramic capacitors of second to fourth embodiments. The same or similar explanation is applied to FIG. 6. FIGS. 5 and 6 illustrate part of metal particles contained in an outer electrode while omitting those contained in the underlying electrode and the inner electrode.

The multilayer ceramic capacitor 10 according to the first embodiment includes a base component 1 and multiple outer electrodes 4 as illustrated in FIGS. 1 to 3. As illustrated in FIG. 2, the base component 1 includes a multilayer body 2 and multiple underlying electrodes 3. The multilayer ceramic capacitor 10 may be a thin multilayer ceramic capacitor in which the dimension T in the height direction (the z-axis direction) is smaller than the dimension L in the longitudinal direction (the x-axis direction) and the dimension W in the width direction (the y-axis direction).

The multilayer body 2 includes multiple inner electrodes 5 and multiple dielectric layers 6 alternately stacked. As illustrated in FIG. 2, the multilayer body 2 may have an approximately rectangular parallelepiped shape. The multilayer body 2 includes a first surface 7a and a second surface 7b opposed to each other in the stacking direction of the multiple inner electrodes 5 and the multiple dielectric layers 6 (the z-axis direction). The multilayer body 2 includes a first end surface 8a and a second end surface 8b opposed to each other in the longitudinal direction (the x-axis direction) orthogonal to the stacking direction and also includes a first side surface 9a and a second side surface 9b opposed to each other in the width direction (the y-axis direction) orthogonal to the stacking direction and the longitudinal direction. Hereinafter, the first surface 7a and the second surface 7b are sometimes collectively referred to as the main surfaces 7a and 7b, the first end surface 8a and the second end surface 8b are sometimes collectively referred to as the end surfaces 8a and 8b, and the first side surface 9a and the second side surface 9b are sometimes collectively referred to as the side surfaces 9a and 9b. The main surfaces 7a and 7b may be perpendicular to the stacking direction. The end surfaces 8a and 8b may be perpendicular to the longitudinal direction. The side surfaces 9a and 9b may be perpendicular to the width direction.

The dielectric layers 6 are composed of, for example, a ceramic material containing $BaTiO_3$ (barium titanate), $CaTiO_3$ (calcium titanate), $SrTiO_3$ (strontium titanate), $BaZrO_3$ (barium zirconate), or $CaZrO_3$ (calcium zirconate) as a major component. The ceramic material may contain, for example, a Mn (manganese) compound, a Mg (magnesium) compound, a Si (silicon) compound, a Co (cobalt) compound, a Ni compound, a rare-earth compound, or the like as a minor component. Each dielectric layer 6 may have a thickness of, for example, approximately 0.1 to 1.0 μm.

As illustrated in FIGS. 2 and 3, the multiple inner electrodes 5 include multiple first inner electrodes 5a and multiple second inner electrodes 5b. Each first inner electrode 5a has an end portion exposed on the first end surface 8a. Each second inner electrode 5b has an end portion exposed on the second end surface 8b. The first inner electrodes 5a and the second inner electrodes 5b have different polarities. In other words, when the first inner electrodes 5a have a first polarity, the second inner electrode 5b have a second polarity different from the first polarity.

The inner electrodes 5 are composed of, for example, a metal material containing Ni (nickel), Cu (copper), Sn (tin), or the like as a major component. The inner electrodes 5 may contain, for example, a ceramic material such as $BaTiO_3$, $CaTiO_3$, $SrTiO_3$, $BaZrO_3$, or $CaZrO_3$. Each inner electrode 5 may have a thickness of, for example, approximately 0.1 to 1.0 μm.

As illustrated in FIG. 3, the multilayer body 2 may include a capacitive portion 2a and cover portions 2b and 2c. The capacitive portion 2a includes the multiple inner electrodes 5 and the multiple dielectric layers 6 alternately stacked and has capacitance. The cover portions 2b and 2c are located at both ends of the capacitive portion 2a in the stacking direction. Each of the cover portions 2b and 2c is composed of one or more dielectric layers and need not have capacitance.

Although not illustrated, each of the cover portions 2b and 2c may be composed of two or more dielectric layers and one or more (less than the number of dielectric layers) dummy layers located between the dielectric layers. Each dummy layer may include multiple dummy electrodes. The multiple dummy electrodes in each dummy layer may overlap the multiple underlying electrodes 3 in transparent plan view. In other words, the multiple dummy electrodes may be provided in the same quantity, at approximately the same positions, and in approximately the same shapes (including the dimensions) as the multiple underlying electrodes 3. The multiple dummy electrodes may be exposed to the outside from one or more of the end surfaces 8a and 8b and the side surfaces 9a and 9b of the multilayer body 2. The multiple outer electrodes 4 may be connected to the exposed portions. The multiple dummy electrodes need not have capacitance. The material (components) and the microstructure of the multiple dummy electrodes may be the same as those of the underlying electrodes 3, may be the same as those of the inner electrodes 5, or may be different from any of those. Note that in some cases, the presence of the dummy layers is ignored, and the cover portions 2b and 2c are described as if each of them were composed of only a dielectric layer, for convenience.

The cover portions 2b and 2c (their dielectric layers) are composed of, for example, a ceramic material containing BaTiO$_3$, CaTiO$_3$, SrTiO$_3$, BaZrO$_3$, CaZrO$_3$, or the like as a major component. The cover portions 2b and 2c may be composed of the same ceramic material as the dielectric layers 6.

The multiple underlying electrodes 3 include a first underlying electrode 3a and a second underlying electrode 3b. The first underlying electrode 3a is located on the first surface 7a and close to the first end surface 8a. The second underlying electrode 3b is located on the first surface 7a and close to the second end surface 8b.

The first underlying electrode 3a and the second underlying electrode 3b are apart from each other as illustrated in FIGS. 2 and 3. The dimension of the first underlying electrode 3a in the longitudinal direction (the x-axis direction) may be approximately 5 to 30% of the dimension of the multilayer body 2 in the longitudinal direction. The second underlying electrode 3b also has the same or a similar configuration. The end edge of the first underlying electrode 3a on the first end surface 8a side may overlap the end edge of the first surface 7a on the first end surface 8a side in plan view. The end edge of the second underlying electrode 3b on the second end surface 8b side may overlap the end edge of the first surface 7a on the second end surface 8b side in plan view.

The underlying electrodes 3 are composed of, for example, a metal material containing Ni, Cu, Sn, or the like as a major component. The underlying electrodes 3 may be composed of the same metal material as the inner electrodes 5. The underlying electrodes 3 may contain, for example, a ceramic material such as BaTiO$_3$, CaTiO$_3$, SrTiO$_3$, BaZrO$_3$, or CaZrO$_3$. This makes it easy to increase the degree of adhesion between the underlying electrodes 3 and the multilayer body 2. Each underlying electrode 3 may be thicker than one inner electrode 5. Each underlying electrode 3 may have a thickness of, for example, approximately 0.5 to 2.0 μm.

The underlying electrodes 3 may include a third underlying electrode 3c and a fourth underlying electrode 3d. The third underlying electrode 3c is located on the second surface 7b and close to the first end surface 8a. The fourth underlying electrode 3d is located on the second surface 7b and close to the second end surface 8b. The third underlying electrode 3c may have the same or a similar configuration as the first underlying electrode 3a except that it is located on the second surface 7b. The fourth underlying electrode 3d may have the same or a similar configuration as the second underlying electrode 3b except that it is located on the second surface 7b.

As illustrated in FIGS. 1 and 3, the multiple outer electrodes 4 include a first outer electrode 4a and a second outer electrode 4b.

The first outer electrode 4a extends from the first end surface 8a at least onto the first surface 7a and is connected to the multiple first inner electrodes 5a and the first underlying electrode 3a. The first outer electrode 4a may cover the first underlying electrode 3a.

The first outer electrode 4a may extend from the first end surface 8a onto the first surface 7a and the second surface 7b and be connected to the multiple first inner electrodes 5a, the first underlying electrode 3a, and the third underlying electrode 3c. The first outer electrode 4a may cover the first underlying electrode 3a and the third underlying electrode 3c. The first outer electrode 4a may extend from the first end surface 8a onto the first surface 7a, the second surface 7b, the first side surface 9a, and the second side surface 9b.

The second outer electrode 4b extends from the second end surface 8b at least onto the first surface 7a and is connected to the multiple second inner electrodes 5b and the second underlying electrode 3b. The second outer electrode 4b may cover the second underlying electrode 3b.

The second outer electrode 4b may extend from the second end surface 8b onto the first surface 7a and the second surface 7b and be connected to the multiple second inner electrodes 5b, the second underlying electrode 3b, and the fourth underlying electrode 3d. The second outer electrode 4b may cover the second underlying electrode 3b and the fourth underlying electrode 3d. The second outer electrode 4b may extend from the second end surface 8b onto the first surface 7a, the second surface 7b, the first side surface 9a, and the second side surface 9b.

The outer electrodes 4 may be each composed of a plating layer formed on the multilayer body 2 by a direct plating method. In a direct plating method, at least part of the plating layer is formed on a surface where a conductor layer serving as an undercoat is not present (in this case, a surface composed of a dielectric of the multilayer body 2). The use of a direct plating method enables a reduction in the thickness of the outer electrodes 4. This enables the multilayer ceramic capacitor 10 to be downsized without reducing the capacitance of the multilayer ceramic capacitor 10. The thickness of the outer electrode 4 may be, for example, approximately 5 to 20 μm. The outer electrodes 4 may be formed by, for example, a plating method such as an electroless plating method or an electroplating method. The outer electrodes 4 may be composed of a metal material containing Cu, Ni, Sn, or the like as a major component.

In the description of the embodiments, the term "plating layer" may be replaced with the term "metal layer containing no ceramic material". The underlying electrodes 3 and the inner electrodes 5 (which mean, from a different perspective, a conductive paste used to form these electrodes) often contain a ceramic material. In contrast, the outer electrodes 4 are substantially free of ceramic materials (intentionally added ceramic materials).

Each outer electrode 4 may be composed of two or more plating layers. As illustrated in FIG. 4, the outer electrodes 4 may include first layers 4aa and 4ba connected to the corresponding underlying electrodes 3 and inner electrodes 5, and second layers 4ab and 4bb covering the first layers 4aa and 4ba. The outer electrodes 4 may include the first layers 4aa and 4ba connected to the corresponding underlying electrodes 3 and inner electrodes 5, the second layers 4ab and 4bb covering the first layers 4aa and 4ba, and third layers (not illustrated) covering the second layers 4ab and 4bb. In this case, the first layers 4aa and 4ba may be formed by a direct plating method.

Each of the first outer electrode 4a and the second outer electrode 4b includes a first portion 41 and a second portion 42. Each first portion 41 is located on the end surface 8a or 8b of the multilayer body 2 and connected to the multiple first inner electrodes 5a or the multiple second inner electrodes 5b. Each second portion 42 is located on the first surface 7a of the multilayer body 2 and connected to the first underlying electrode 3a or the second underlying electrode 3b. Each second portion 42 may cover the first underlying electrode 3a or the second underlying electrode 3b. Each outer electrode 4 may further include a second portion 42 located on the second surface 7b and connected to the third underlying electrode 3c or the fourth underlying electrode 3d. The first portions 41 are also referred to as the end-surface electrode portions. The second portions 42 are also referred to as the main-surface electrode portions.

The end-surface electrode portion 41 of the first outer electrode 4a is located on the first end surface 8a and connected to the end portions of the multiple first inner electrodes 5a exposed on the first end surface 8a. The main-surface electrode portion 42 of the first outer electrode 4a is located on the first surface 7a and connected to the first underlying electrode 3a. The main-surface electrode portion 42 of the first outer electrode 4a may cover the first underlying electrode 3a. The first outer electrode 4a may include main-surface electrode portions 42 located on the first surface 7a and the second surface 7b and connected to the first underlying electrode 3a and the third underlying electrode 3c. The main-surface electrode portions 42 of the first outer electrode 4a may cover the first underlying electrode 3a and the third underlying electrode 3c.

The end-surface electrode portion 41 of the second outer electrode 4b is located on the second end surface 8b and connected to the end portions of the multiple second inner electrodes 5b exposed on the second end surface 8b. The main-surface electrode portion 42 of the second outer electrode 4b is located on the first surface 7a and connected to the second underlying electrode 3b. The main-surface electrode portion 42 of the second outer electrode 4b may cover the second underlying electrode 3b. The second outer electrode 4b may include main-surface electrode portions 42 located on the first surface 7a and the second surface 7b and connected to the second underlying electrode 3b and the fourth underlying electrode 3d. The main-surface electrode portions 42 of the second outer electrode 4b may cover the second underlying electrode 3b and the fourth underlying electrode 3d.

The outer electrodes 4 contain metal particles M. The multilayer ceramic capacitor 10 has a configuration in which the average particle diameter of the metal particles M contained in the end-surface electrode portion 41 is smaller than the average particle diameter of the metal particles M contained in the main-surface electrode portion 42. Although the multilayer ceramic capacitor 10 can be mounted on a circuit board such that the first surface 7a or the second surface 7b faces a mounting surface of the circuit board, the main-surface electrode portions 42 extending approximately parallel to the mounting surface are likely to receive a stress when the multilayer ceramic capacitor 10 is mounted, and cracks are likely to occur in the main-surface electrode portions 42. Since the average particle diameter of the metal particles contained in the main-surface electrode portion 42 is relatively large in the multilayer ceramic capacitor 10, the grain boundary area (the grain boundary area of the metal particles M) where crack are likely to start is small, and this improves the mechanical strength of the main-surface electrode portion 42. This in turn reduces the possibility of the occurrence of cracks in the main-surface electrode portion 42, improving the reliability of the multi-layer ceramic capacitor 10.

In addition, since the average particle diameter of the metal particles M contained in the end-surface electrode portion 41 is relatively small in the multilayer ceramic capacitor 10, the contact area between the metal particles M contained in the end-surface electrode portion 41 and the metal particles contained in the inner electrodes 5 can be larger. This enables a favorable connection between the end-surface electrode portion 41 and the inner electrodes 5, improving the electrical characteristics of the multilayer ceramic capacitor 10.

In a configuration in which the outer electrode 4 has multiple metal layers (plating layers) as illustrated in FIG. 4, the end-surface electrode portion 41 and the main-surface electrode portion 42 may be parts of the metal layer closest to the multilayer body 2, may be parts of two or more metal layers selected from the multilayer body 2 side (for example, the two layers on the multilayer body 2 side in a three-layer structure), or may be parts of all the metal layers. In other words, the condition that the average particle diameter of the metal particles M in the end surface portion is smaller than the average particle diameter of the metal particles M in the main surface portion may be met only in one layer closest to the multilayer body 2, may be met only in two or more layers (excluding all the layers) selected from the multilayer body 2 side, or may be met in all the layers. Note that unlike the explanation above, it may be made an indispensable require-ment that the above condition is met in one layer closest to the multilayer body 2, that the above condition is met in two or more metal layers (excluding all the layers) selected from the multilayer body 2 side, or that the above condition is met in all the layers.

When each of the end-surface electrode portion 41 and the main-surface electrode portion 42 is part of two or more metal layers, the condition that the average particle diameter of the metal particles M in the end surface portion is smaller than the average particle diameter of the metal particles M in the main surface portion may be met in each of the two or more metal layers to be considered and/or or may be met in terms of the average particle diameter of all of the two or more metal layers.

Note that the description in the previous two paragraphs may be applied not only to the condition that the average particle diameter of the metal particles M in the end surface portion is smaller than the average particle diameter of the metal particles M in the main surface portion but also to other conditions related to particle diameters, unless a con-tradiction or the like occurs. For example, a condition described later that the particle diameter decreases or increases as the distance to the multilayer body 2 decreases may be met only in one layer closest to the multilayer body 2, may be met in two or more layers (excluding all the layers) selected from the multilayer body 2 side, or may be met in all the layers. Alternatively, one of these conditions may be made an indispensable requirement. The description of the specific examples of the average particle diameter (μm) or the material may be applied to only one layer closest to the multilayer body 2, two or more layers (excluding all the layers) selected from the multilayer body 2 side, or all the layers.

The average particle diameter of the metal particles M contained in the end-surface electrode portion 41 may be, for example, 0.3 to 0.8 μm, or 0.5 to 0.6 μm. The average particle diameter of the metal particles M contained in the main-surface electrode portion 42 may be, for example, 0.3 to 1.3 μm, or approximately 0.6 to 1.0 μm.

The underlying electrodes 3 and the inner electrodes 5 may contain Ni as a major component, and the outer electrodes 4 may contain Cu as a major component. In this case, metal particles composed of a Cu—Ni alloy are formed in regions close to the interface between the base component 1 and the outer electrode 4, so that the average particle diameter of these metal particles can be relatively large. This improves the mechanical strength of the main-surface elec-trode portion 42 and also makes it easy to increase the degree of adhesion between the base component 1 and the outer electrodes 4.

The average particle diameter of the metal particles M in the end-surface electrode portion 41, at position P a specified distance L1 away from the surface on the multilayer body 2 side may be smaller than the average particle diameter of the metal particles M in the main-surface electrode portion 42, at position Q the specified distance L1 away from the surface on the multilayer body 2 side (see FIGS. 5 and 6). The specified distance L1 may be, for example, 0.5 to 1.5 μm, or 1 μm. Since the average particle diameter of the metal particles M contained in regions of the main-surface electrode portion 42 close to the underlying electrode 3 is relatively large, the possibility of the occurrence of cracks in the regions can be low, and this improves the reliability of the multilayer ceramic capacitor 10. In addition, since the average particle diameter of the metal particles M contained in regions of the end-surface electrode portion 41 close to the inner electrodes 5 is relatively small, a favorable connection can be achieved between the end-surface electrode portion 41 and the inner electrodes 5, and this improves the electrical characteristics of the multilayer ceramic capacitor 10.

The average particle diameter of the metal particles M at position P is, in other words, the average value of the particle diameters of multiple metal particles M the sections of which include position P. Similarly, the average particle diameter of the metal particles M at position Q is the average value of the particle diameters of multiple metal particles M the sections of which include position Q. The same or similar definition can be applied to the average particle diameter of the metal particles at position S or R described later.

The average particle diameter of the metal particles M contained in the main-surface electrode portion 42 may be 1.1 times or more, 1.5 times or more, or 2 times or more the average particle diameter of the metal particles M contained in the end-surface electrode portion 41 and may be 5 times or less, 3 times or less, or 2.7 times or less that of the main-surface electrode portion 42. Any of the upper limits and any of the lower limits mentioned above may be combined. For example, the average particle diameter of the metal particles M contained in the main-surface electrode portion 42 may be 1.1 to 2.7 times the average particle diameter of the metal particles M contained in the end-surface electrode portion 41. This configuration enables a favorable connection between the end-surface electrode portion 41 and the inner electrode 5 and improves the mechanical strength of the main-surface electrode portion 42. The upper limits and/or lower limits mentioned above may be applied to the ratio of the average particle diameter of the metal particles M at position Q to the average particle diameter of the metal particles M at position P.

In the end-surface electrode portion 41, the particle diameter of metal particles M contained in the end-surface electrode portion 41 may decrease as the distance to the multilayer body 2 decreases. This enables a more favorable connection between the end-surface electrode portion 41 and the inner electrode 5 and further improves the electrical characteristics of the multilayer ceramic capacitor 10. This also reduces the grain boundary area in regions close to the outer surface (the surface opposite to the surface facing the multilayer body 2) of the end-surface electrode portion 41. This in turn reduces the possibility of the occurrence of cracks in regions close to the outer surface of the end-surface electrode portion 41, mitigating the decrease in the moisture resistance of the multilayer ceramic capacitor 10.

Note that the condition that the particle diameter of metal particles M decreases as the distance to the multilayer body 2 decreases does not necessarily require that the particle diameters of all of the metal particles M strictly satisfy this relationship. For example, when the particle diameters of 3 or more particles, 10 or more particles, or 50 or more particles are measured out of the metal particles M contained in the end-surface electrode portion 41, and this relationship holds, the condition is considered to be met. For example, when the particle diameters of a specified number of metal particles M are measured, and 60% or more or 80% or more of the metal particles M satisfy the relationship mentioned above, the condition is considered to be met. In other words, when a specified number of metal particles M are selected in random, and 60% or more or 80% or more of the specified number of the metal particles M satisfying the relationship mentioned above can be extracted, the condition is considered to be met. The larger the specified number, the more accurately whether the relationship mentioned above holds or not can be determined. However, for example, the specified number may be 10, 50, or 100. The comparison of the positions of metal particles M may be based on their geometric centers. For example, when it is assumed that the end-surface electrode portion 41 is equally divided into two regions in the thickness direction, and the average particle diameter is smaller in the region close to the multilayer body 2 than in the region away from the multilayer body 2, it may be determined that the relationship mentioned above holds. Instead of being equally divided into two regions, the end-surface electrode portion 41 may be equally divided into three regions or five regions. Which region each metal particle M belongs to can be determined based on the geometric center of the metal particle M. In any measurement and determination, particles extremely smaller than the surrounding particles may be ignored for the determination on the relationship mentioned above holds.

In the main-surface electrode portion 42, the particle diameter of the metal particles M contained in the main-surface electrode portion 42 may increase as the distance to the multilayer body 2 decreases. In this case, the average particle diameter of the metal particles M contained in regions of the main-surface electrode portion 42 close to the underlying electrode 3 is relatively large. This configuration further reduces the possibility of the occurrence of cracks in the regions that are close to the multilayer body 2 and apt to affect the electrical characteristics, and thus further improves the reliability of the multilayer ceramic capacitor 10. Note that the condition that the particle diameter of metal particles M increases as the distance to the multilayer body 2 decreases does not necessarily require that the particle diameters of all of the metal particles M strictly satisfy this relationship. The explanation in the previous paragraph may be applied in this regard. For example, when the particle diameters of 3 or more particles, 10 or more particles, or 50 or more particles are measured out of the metal particles M contained in the main-surface electrode portion 42, and this relationship holds, the condition is considered to be met.

The multilayer ceramic capacitor 10 may have a configuration in which the average particle diameter of the metal particles contained in the underlying electrode 3 is larger than the average particle diameter of the metal particles contained in the inner electrode 5. Since the average particle diameter of the metal particles contained in the underlying electrode 3 is relatively large, the possibility of the occurrence of cracks in regions of the underlying electrode 3 close to the outer electrode 4 can be reduced, and this improves the reliability of the multilayer ceramic capacitor 10. In addition, since the average particle diameter of the metal particles contained in the inner electrode 5 is relatively small, the contact area between the metal particles contained in the inner electrode 5 and the metal particles M contained in the outer electrode 4 (the end-surface electrode portion 41) can be increased. This enables a favorable connection between the outer electrode 4 and the inner electrode 5 and improves the electrical characteristics of the multilayer ceramic capacitor 10.

The multilayer ceramic capacitor 10 may have a configuration in which the average particle diameter of the metal particles in the underlying electrode 3, at position S a specified distance L' away from the surface of the underlying electrode 3 opposite to the surface on the multilayer body 2 side is larger than the average particle diameter of the metal particles in the inner electrode 5, at position R the specified distance L' away from the surface (the end surfaces 8a and 8b) of the multilayer body 2 (see FIGS. 5 and 6). The specified distance L' may be, for example, 0.5 to 1.5 μm, or 1 μm. Since the average particle diameter of the metal particles contained in regions of the underlying electrode 3 close to the outer electrode 4 (the main-surface electrode portion 42) is relatively large, the possibility of the occurrence of cracks in the regions can be reduced, and this improves the reliability of the multilayer ceramic capacitor 10. In addition, since the average particle diameter of the metal particles contain in regions of the inner electrode 5 close to the outer electrode 4 (the end-surface electrode portion 41) is relatively small, a favorable connection can be achieved between the inner electrode 5 and the outer electrode 4, and this improves the electrical characteristics of the multilayer ceramic capacitor 10.

A method of measuring the particle diameter of the metal particles contained in the underlying electrode 3, the outer electrode 4, and the inner electrode 5 will be described.

First, by using a focused ion beam-scanning electron microscope (FIB-SEM), cross sections of the multilayer ceramic capacitor 10 are prepared, and electronic microscope images of the cross sections are captured. FIGS. 7 and 8 illustrate electronic microscope images of cross sections of the multilayer ceramic capacitor 10, captured at a magnification of 15000×. FIG. 7 corresponds to an electronic microscope image of portion V in FIG. 3, and B1 in FIG. 7 indicates the interface between the outer electrode 4 (the main-surface electrode portion 42) and the underlying electrode 3. FIG. 8 corresponds to an electronic microscope image of portion VI in FIG. 3, and B2 in FIG. 8 indicates the interface between the outer electrode 4 (the end-surface electrode portion 41) and the multilayer body 2. Note that the FIB-SEM used in this measurement is a Helios 5UC available from Thermo Fisher Scientific Inc., and the acceleration voltage was set to 30 KV, and the irradiation current was set to 80 pA as the analysis conditions.

Next, the electronic microscope images of FIGS. 7 and 8 are analyzed by using an image analysis program, and the boundary lines along the outer shapes of the metal particles are depicted as indicated by the dashed lines in FIGS. 7 and 8. To measure the particle diameter of a metal particle, the area of the region surrounded by the boundary lines is calculated, the diameter of the equivalent circle of this area may be regarded as the particle diameter of the metal particle. An existing image analysis program may be used for the image analysis program. To calculate the average particle diameter of the metal particles contained in the main-surface electrode portion 42 of the outer electrode 4, the particle diameters of N (N is a natural number) metal particles contained in the main-surface electrode portion 42 are calculated, and the arithmetic mean of those may be regarded as the average particle diameter of the metal particles. N may be, for example, approximately 3 to 15 or approximately 10. The same or similar explanation can be applied to the average particle diameter of the metal particles contained in each of the end-surface electrode portion 41, the underlying electrode 3, and the inner electrode 5.

N may be larger than the numbers mentioned above. For example, N may be 20, 50, or 100. The average particle diameter may be measured by analyzing the entire cross section of the electrode (or the portion or region) of interest, or may be the average value of the particle diameters measured by analyzing multiple partial regions in the cross section mentioned above. The number of multiple partial regions may be, for example, 3 or more, or 5 or more, and each of the multiple partial regions may have approximately the same area. The multiple partial regions may be set to be spaced at equal intervals in the right-left direction, and/or at equal intervals in the thickness direction. Regarding the direction orthogonal to a cross section, the average particle diameter may be a value of one cross section at a specific position (for example, a typical position such as the center position) of the target (an electrode or the like) or may be the average value of multiple (for example, 3 or more or 5 or more) cross sections obtained by dividing the target into equal parts. For the latter case, if it is difficult to divide the target into equal parts, multiple multilayer ceramic capacitors 10 intended to have the same configuration may be used. Multiple cross sections may be measured by using multiple multilayer ceramic capacitors 10 so as to correspond to the multiple cross sections obtained by the equal division mentioned above, and the average value of the measurement results of the multiple sections may be calculated. Note that the same or similar explanation can be applied to other characteristics or indicator values in that the cross section at a specific position can be measured, or that multiple sections can be measured, and the average value of the measurement results can be used, as mentioned above.

Figure 9:
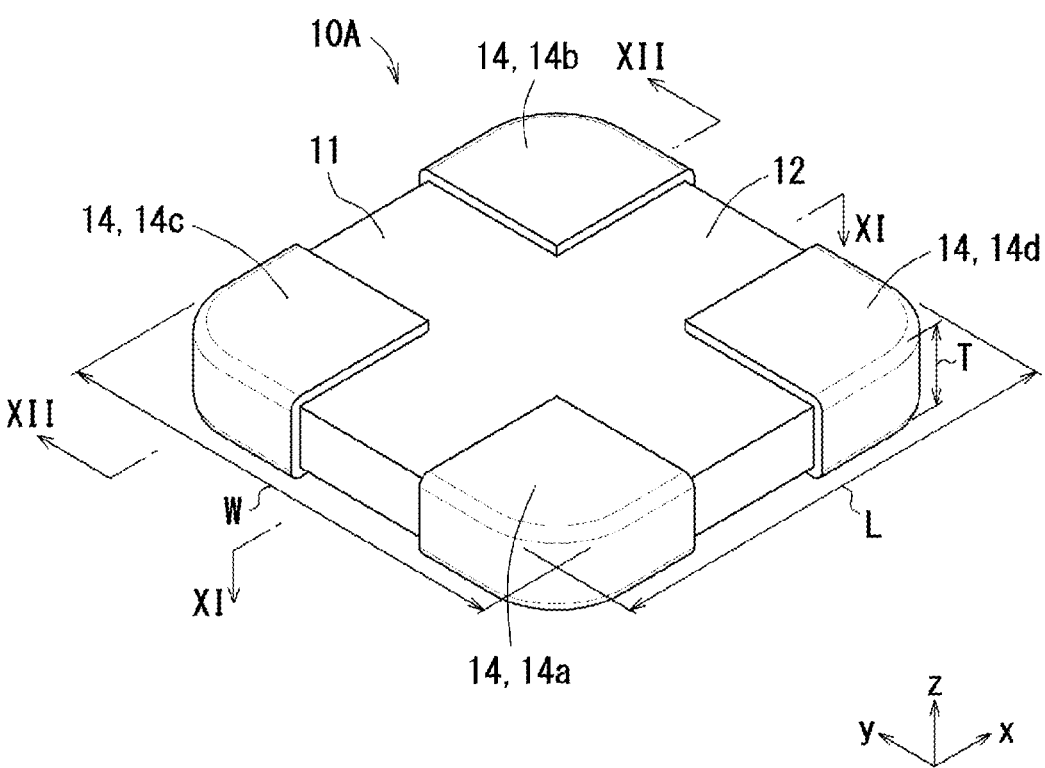
FIG. 9 is a perspective view of a multilayer ceramic capacitor of a second embodiment.
Figure 10:
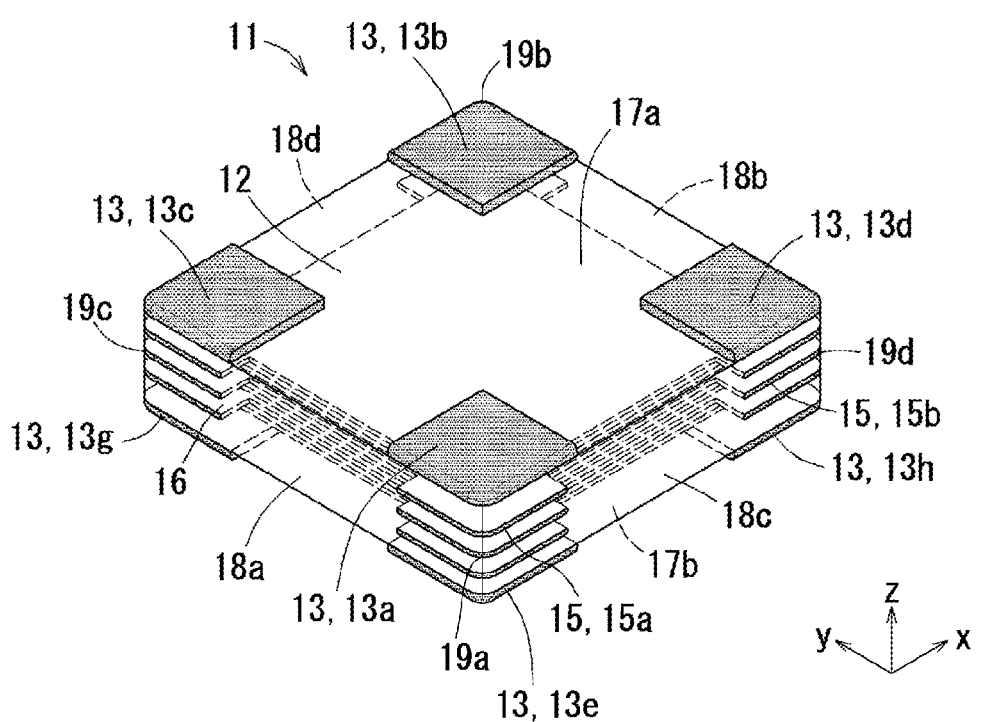
FIG. 10 is a perspective view of a base component of the multilayer ceramic capacitor in FIG. 9.
Figure 11:
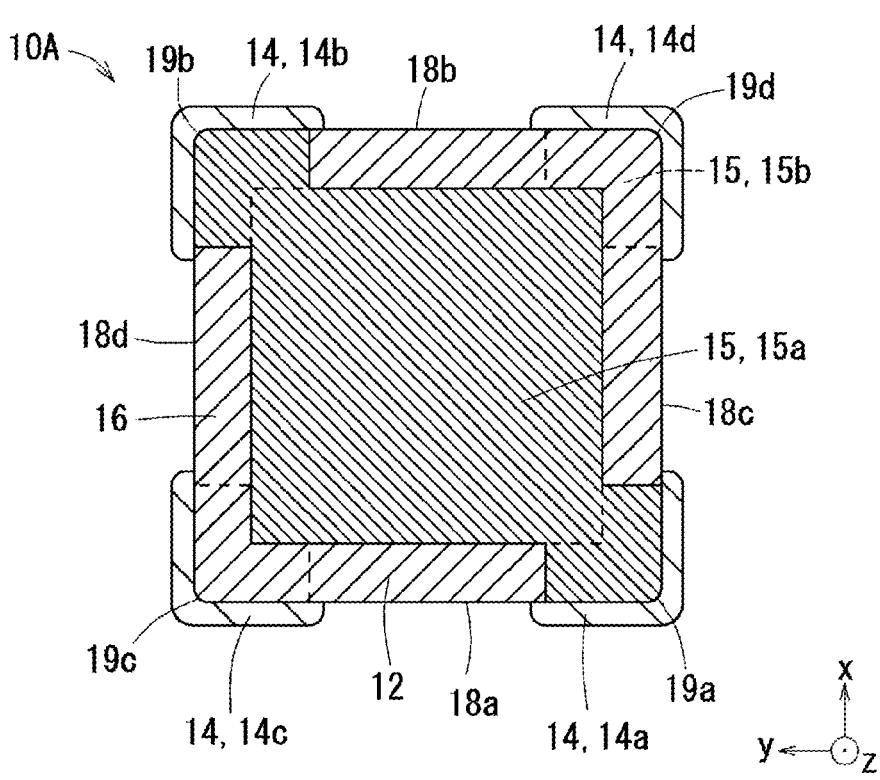
FIG. 11 is a diagram illustrating an example of a cross section taken along cross-section line XI-XI in FIG. 9.
Figure 12:
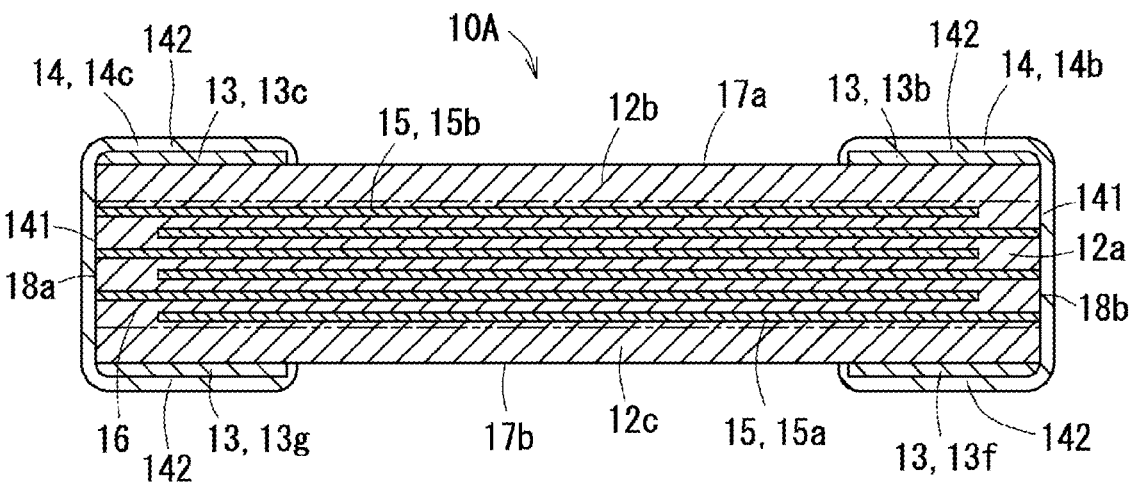
FIG. 12 is a diagram illustrating an example of a cross section taken along cross-section line XII-XII in FIG. 9.
Figure 12:
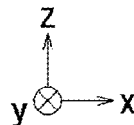

A multilayer ceramic capacitor according to a second embodiment of the present disclosure will be described. FIG. 9 is a perspective view of a multilayer ceramic capacitor of the second embodiment, FIG. 10 is a perspective view of a base component of the multilayer ceramic capacitor in FIG. 9, FIG. 11 is a cross-sectional view taken along cross-section line XI-XI in FIG. 9, and FIG. 12 is a cross-sectional view taken along cross-section line XII-XII in FIG. 9. In FIG. 10, underlying electrodes and the end portions of inner electrodes exposed on surfaces of the multilayer body are hatched to makes it easy to understand the illustration.

As illustrated in FIGS. 9 to 12, a multilayer ceramic capacitor 10A of the present embodiment includes a base component 11 and multiple outer electrodes 14. As illustrated in FIG. 10, the base component 11 includes a multilayer body 12 and multiple underlying electrodes 13. The multilayer ceramic capacitor 10A may be a thin multilayer ceramic capacitor in which the dimension T in the height direction (the z-axis direction) is smaller than the dimension L in the longitudinal direction (the x-axis direction) and smaller than the dimension W in the width direction (the y-axis direction).

The multilayer body 12 includes multiple inner electrodes 15 and multiple dielectric layers 16 alternately stacked. As illustrated in FIG. 10, the multilayer body 12 may have an approximately rectangular parallelepiped shape. The multilayer body 12 includes a first surface 17a and a second surface 17b opposed to each other in the stacking direction of the multiple inner electrodes 15 and the multiple dielectric layers 16 (the z-axis direction). The multilayer body 12 includes a first side surface 18a and a second side surface 18b opposed to each other in the longitudinal direction (the x-axis direction) orthogonal to the stacking direction and also includes a third side surface 18c and a fourth side surface 18*d* opposed to each other in the width direction (the y-axis direction) orthogonal to the stacking direction and the longitudinal direction. In the following, the first surface 17*a* and the second surface 17*b* are sometimes collectively referred to as the main surfaces 17*a* and 17*b*, and the first side surface 18*a*, the second side surface 18*b*, the third side surface 18*c*, and the fourth side surface 18*d* are sometimes collectively referred to as the side surfaces 18*a* to 18*d*. The main surfaces 17*a* and 17*b* may be perpendicular to the stacking direction. The first side surface 18*a* and the second side surface 18*b* may be perpendicular to the longitudinal direction. The third side surface 18*c* and the fourth side surface 18*d* may be perpendicular to the width direction.

As illustrated in FIGS. 10 and 11, the multilayer body 12 includes a first corner portion 19*a* extending over the first side surface 18*a* and the third side surface 18*c*, a second corner portion 19*b* extending over the second side surface 18*b* and the fourth side surface 18*d*, a third corner portion 19*c* extending over the first side surface 18*a* and the fourth side surface 18*d*, and a fourth corner portion 19*d* extending over the second side surface 18*b* and the third side surface 18*c*.

The dielectric layers 16 are composed of, for example, a ceramic material containing $BaTiO_3$, $CaTiO_3$, $SrTiO_3$, $BaZrO_3$, $CaZrO_3$, or the like as a major component. The ceramic material may contain, for example, a Mn compound, a Mg compound, a Si compound, a Co compound, a Ni compound, a rare-earth compound, or the like as a minor component. Each dielectric layer 16 may have a thickness of, for example, approximately 0.1 to 1.0 μm.

As illustrated in FIG. 12, the multiple inner electrodes 15 include multiple first inner electrodes 15*a* and multiple second inner electrodes 15*b*. Each first inner electrode 15*a* has end portions exposed at the first corner portion 19*a* and the second corner portion 19*b*. Each second inner electrode 15*b* has end portions exposed at the third corner portion 19*c* and the fourth corner portion 19*d*. The first inner electrodes 15*a* and the second inner electrodes 15*b* have different polarities. In other words, when the first inner electrodes 15*a* have a first polarity, the second inner electrodes 15*b* have a second polarity different from the first polarity.

The inner electrodes 15 are composed of, for example, a metal material containing Ni, Cu, Sn, or the like as a major component. The inner electrodes 15 may contain, for example, a ceramic material such as $BaTiO_3$, $CaTiO_3$, $SrTiO_3$, $BaZrO_3$, or $CaZrO_3$. Each inner electrode 15 may have a thickness of, for example, approximately 0.1 to 1.0 μm.

As illustrated in FIG. 12, the multilayer body 12 may include a capacitive portion 12*a* and cover portions 12*b* and 12*c*. The capacitive portion 12*a* includes the multiple inner electrodes 15 and the multiple dielectric layers 16 alternately stacked and has capacitance. The cover portions 12*b* and 12*c* are located at both ends of the capacitive portion 12*a* in the stacking direction. Each of the cover portions 12*b* and 12*c* is composed of one or more dielectric layers and need not have capacitance.

The cover portions 12*b* and 12*c* (their dielectric layers) are composed of, for example, a ceramic material containing $BaTiO_3$, $CaTiO_3$, $SrTiO_3$, $BaZrO_3$, $CaZrO_3$, or the like as a major component. The cover portions 12*b* and 12*c* may be composed of the same ceramic material as the dielectric layers 16.

The multiple underlying electrodes 13 include a first underlying electrode 13*a*, a second underlying electrode 13*b*, a third underlying electrode 13*c*, and a fourth underlying electrode 13*d*.

The first underlying electrode 13*a* is located on the first surface 17*a* and close to the first corner portion 19*a*. In plan view, the first underlying electrode 13*a* may be approximately rectangular. In plan view, the corner portion of the first underlying electrode 13*a* close to the first corner portion 19*a* may overlap the first corner portion 19*a*.

The second underlying electrode 13*b* is located on the first surface 17*a* and close to the second corner portion 19*b*. In plan view, the second underlying electrode 13*b* may be approximately rectangular. In plan view, the corner portion of the second underlying electrode 13*b* close to the second corner portion 19*b* may overlap the second corner portion 19*b*.

The third underlying electrode 13*c* is located on the first surface 17*a* and close to the third corner portion 19*c*. In plan view, the third underlying electrode 13*c* may be approximately rectangular. In plan view, the corner portion of the third underlying electrode 13*c* close to the third corner portion 19*c* may overlap the third corner portion 19*c*.

The fourth underlying electrode 13*d* is located on the first surface 17*a* and close to the fourth corner portion 19*d*. In plan view, the fourth underlying electrode 13*d* may be approximately rectangular. In plan view, the corner portion of the fourth underlying electrode 13*d* close to the fourth corner portion 19*d* may overlap the fourth corner portion 19*d*.

The shape of the first underlying electrode 13*a* is not limited to approximately rectangular shapes and may be approximately a sector shape (approximately a quadrant) or approximately a right triangle. In plan view of the first underlying electrode 13*a*, the center of an approximately sector shape (approximately a quadrant) may overlap the first corner portion 19*a*, or the right-angled vertex of an approximately right triangle may overlap the first corner portion 19*a*. The same or similar explanation can be applied to the second underlying electrode 13*b*, the third underlying electrode 13*c*, and the fourth underlying electrode 13*d*.

The underlying electrodes 13 may include a fifth underlying electrode 13*e*, a sixth underlying electrode 13*f*, a seventh underlying electrode 13*g*, and an eighth underlying electrode 13*h*. The fifth underlying electrode 13*e* is located on the second surface 7*b* and close to the first corner portion 19*a*. The sixth underlying electrode 13*f* is located on the second surface 7*b* and close to the second corner portion 19*b*. The seventh underlying electrode 13*g* is located on the second surface 7*b* and close to the third corner portion 19*c*. The eighth underlying electrode 13*h* is located on the second surface 7*b* and close to the fourth corner portion 19*d*. The fifth underlying electrode 13*e* and the sixth underlying electrode 13*f* may have the same or similar configurations as the first underlying electrode 13*a* and the second underlying electrode 13*b* except that they are located on the second surface 7*b*. The seventh underlying electrode 13*g* and the eighth underlying electrode 13*h* may have the same or similar configurations as the third underlying electrode 13*c* and the fourth underlying electrode 13*d* except that they are located on the second surface 7*b*.

The multiple outer electrodes 14 include a first outer electrode 14*a*, a second outer electrode 14*b*, a third outer electrode 14*c*, and a fourth outer electrode 14*d*.

The first outer electrode 14*a* extends from the first corner portion 19*a* at least onto the first surface 17*a* and is connected to the multiple first inner electrodes 15*a* and the first underlying electrode 13*a*. The first outer electrode 14*a* may extend from the first corner portion 19*a* onto the first surface 17*a* and the second surface 17*b* and be connected to the multiple first inner electrodes 15a, the first underlying electrode 13a, and the fifth underlying electrode 13e.

The second outer electrode 14b extends from the second corner portion 19b at least onto the first surface 17a and is connected to the multiple first inner electrodes 15a and the second underlying electrode 13b. The second outer electrode 14b may extend from the second corner portion 19b onto the first surface 17a and the second surface 17b and be connected to the multiple first inner electrodes 15a, the second underlying electrode 13b, and the sixth underlying electrode 13f.

The third outer electrode 14c extends from the third corner portion 19c at least onto the first surface 17a and is connected to the multiple second inner electrodes 15b and the third underlying electrode 13c. The third outer electrode 14c may extend from the third corner portion 19c onto the first surface 17a and the second surface 17b and be connected to the multiple second inner electrodes 15b, the third underlying electrode 13c, and the seventh underlying electrode 13g.

The fourth outer electrode 14d extends from the fourth corner portion 19d at least onto the first surface 17a and is connected to the multiple second inner electrodes 15b and the fourth underlying electrode 13d. The fourth outer electrode 14d may extend from the fourth corner portion 19d onto the first surface 17a and the second surface 17b and be connected to the multiple second inner electrodes 15b, the fourth underlying electrode 13d, and the eighth underlying electrode 13h.

Each outer electrode 14 may be composed of a plating layer. In this case, the thickness of the outer electrode 14 can be reduced. This configuration enables the multilayer ceramic capacitor 10A to be downsized without reducing the capacitance of the multilayer ceramic capacitor 10A. The thickness of the outer electrode 14 may be, for example, approximately 5 to 20 μm. The outer electrodes 14 may be formed by, for example, a plating method such as an electroless plating method or an electroplating method. The outer electrodes 14 may be composed of a metal material containing Cu, Ni, Sn, or the like as a major component.

Each outer electrode 14 may be composed of two or more plating layers. Each outer electrode 14, for example, may be composed of a first layer connected to the corresponding underlying electrodes 13 and inner electrodes 15 and a second layer covering the first layer, or may be composed of a first layer connected to the corresponding underlying electrodes 13 and inner electrodes 15, a second layer covering the first layer, and a third layer covering the second layer.

Each of the first outer electrode 14a, the second outer electrode 14b, the third outer electrode 14c, and the fourth outer electrode 14d includes a first portion 141 and a second portion 142. Each first portion 141 is located on the corresponding ones of the side surfaces 18a to 18d and connected to the multiple first inner electrodes 5a or the multiple second inner electrodes 5b. Each second portion 142 is located on the first surface 17a and connected to the first underlying electrode 13a, the second underlying electrode 13b, the third underlying electrode 13c, or the fourth underlying electrode 13d. Each second portion 142 may completely cover the first underlying electrode 13a, the second underlying electrode 13b, the third underlying electrode 13c, or the fourth underlying electrode 13d. Each outer electrode 14 may further include a second portion 142 located on the second surface 17b and connected to the fifth underlying electrode 13e, the sixth underlying electrode 13f, the seventh underlying electrode 13g, or the eighth underlying electrode 13h. The first portions 141 are also referred to as the end-surface electrode portions, and the second portions 142 are also referred to as the main-surface electrode portions.

The end-surface electrode portion 141 of the first outer electrode 14a is located on the first side surface 18a and the third side surface 18c and connected to the end portions of the multiple first inner electrodes 15a exposed on the first side surface 18a and the third side surface 18c. The main-surface electrode portion 142 of the first outer electrode 14a is located on the first surface 17a and connected to the first underlying electrode 13a. The main-surface electrode portion 142 of the first outer electrode 14a may cover the first underlying electrode 13a. The first outer electrode 14a may include main-surface electrode portions 142 located on the first surface 17a and the second surface 17b and connected to the first underlying electrode 13a and the fifth underlying electrode 13e. The main-surface electrode portions 142 of the first outer electrode 14a may cover the first underlying electrode 13a and the fifth underlying electrode 13e.

The end-surface electrode portion 141 of the second outer electrode 14b is located on the second side surface 18b and the fourth side surface 18d and connected to the end portions of the multiple first inner electrodes 15a exposed on the second side surface 18b and the fourth side surface 18d. The main-surface electrode portion 142 of the second outer electrode 14b is located on the first surface 17a and connected to the second underlying electrode 13b. The main-surface electrode portion 142 of the second outer electrode 14b may cover the second underlying electrode 13b. The second outer electrode 14b may include main-surface electrode portions 142 located on the first surface 17a and the second surface 17b and connected to the second underlying electrode 13b and the sixth underlying electrode 13f. The main-surface electrode portions 142 of the second outer electrode 14b may cover the second underlying electrode 13b and the sixth underlying electrode 13f.

The end-surface electrode portion 141 of the third outer electrode 14c is located on the first side surface 18a and the fourth side surface 18d and connected to the end portions of the multiple second inner electrodes 15b exposed on the first side surface 18a and the fourth side surface 18d. The main-surface electrode portion 142 of the third outer electrode 14c is located on the first surface 17a and connected to the third underlying electrode 13c. The main-surface electrode portion 142 of the third outer electrode 14c may cover the third underlying electrode 13c. The third outer electrode 14c may include main-surface electrode portions 142 located on the first surface 17a and the second surface 17b and connected to the third underlying electrode 13c and the seventh underlying electrode 13g. The main-surface electrode portions 142 of the third outer electrode 14c may cover the third underlying electrode 13c and the seventh underlying electrode 13g.

The end-surface electrode portion 141 of the fourth outer electrode 14d is located on the second side surface 18b and the third side surface 18c and connected to the end portions of the multiple second inner electrodes 15b exposed on the second side surface 18b and the third side surface 18c. The main-surface electrode portion 142 of the fourth outer electrode 14d is located on the first surface 17a and connected to the fourth underlying electrode 13d. The main-surface electrode portion 142 of the fourth outer electrode 14d may cover the fourth underlying electrode 13d. The fourth outer electrode 14d may include main-surface electrode portions 142 located on the first surface 17a and the second surface 17b and connected to the fourth underlying electrode 13d and the eighth underlying electrode 13h. The main-surface electrode portions 142 of the first outer electrode 14$a$ may cover the fourth underlying electrode 13$d$ and the eighth underlying electrode 13$h$.

The outer electrodes 14 contain metal particles M. The multilayer ceramic capacitor 10A has a configuration in which the average particle diameter of the metal particles M contained in the end-surface electrode portion 141 is smaller than the average particle diameter of the metal particles M contained in the main-surface electrode portion 142. The effects of this configuration are the same as or similar to those of the first embodiment.

The average particle diameter of the metal particles M contained in the end-surface electrode portion 141 may be, for example, 0.3 to 0.8 μm, or 0.5 to 0.6 μm. The average particle diameter of the metal particles M contained in the main-surface electrode portion 142 may be, for example, 0.3 to 1.3 μm, or approximately 0.6 to 1.0 μm.

The underlying electrodes 13 and the inner electrodes 15 may contain Ni as a major component, and the outer electrodes 14 may contain Cu as a major component. The effects in this case are the same as or similar to those of the first embodiment.

The average particle diameter of the metal particles M in the end-surface electrode portion 141, at position P a specified distance L1 away from the surface on the multilayer body 12 side may be smaller than the average particle diameter of the metal particles M in the main-surface electrode portion 142, at position Q the specified distance L1 away from the surface on the multilayer body 12 side (see FIGS. 5 and 6). The specified distance L1 may be, for example, 0.5 to 1.5 μm, or 1 μm. The effects in this case are the same as or similar to those of the first embodiment.

The average particle diameter of the metal particles M contained in the main-surface electrode portion 142 may be 1.1 to 2.7 times the average particle diameter of the metal particles M contained in the end-surface electrode portion 141. The effects in this case are the same as or similar to those of the first embodiment.

In the end-surface electrode portion 141, the particle diameter of the metal particles M contained in the end-surface electrode portion 141 may decrease as the distance to the multilayer body 12 decreases. The effects in this case are the same as or similar to those of the first embodiment. As in the first embodiment, it is not necessarily required that the particle diameters of all of the metal particles M strictly satisfy the relationship mentioned above. For example, when the particle diameters of 3 or more particles, 10 or more particles, or 50 or more particles are measured out of the metal particles M contained in the end-surface electrode portion 141, and this relationship holds, the condition mentioned above is considered to be met.

In the main-surface electrode portion 142, the particle diameter of the metal particles M contained in the main-surface electrode portion 142 may increase as the distance to the multilayer body 12 decreases. The effects in this case are the same as or similar to those of the first embodiment. As in the first embodiment, it is not necessarily required that the particle diameters of all of the metal particles M strictly satisfy the relationship mentioned above. For example, when the particle diameters of 3 or more particles, 10 or more particles, or 50 or more particles are measured out of the metal particles M contained in the main-surface electrode portion 142, and this relationship holds, the condition mentioned above is considered to be met.

The multilayer ceramic capacitor 10A may have a configuration in which the average particle diameter of the metal particles contained in the underlying electrode 13 is larger than the average particle diameter of the metal particles contained in the inner electrode 15. The effects in this case are the same as or similar to those of the first embodiment.

The multilayer ceramic capacitor 10A may have a configuration in which the average particle diameter of the metal particles in the underlying electrode 13, at position S a specified distance L' away from the surface of the underlying electrode 13 opposite to the surface on the multilayer body 12 side is larger than the average particle diameter of the metal particles in the inner electrode 15, at position R the distance L' away from the surface (the side surfaces 18$a$ to 18$d$) of the multilayer body 12 (see FIGS. 5 and 6). The specified distance L' may be, for example, 0.5 to 1.5 μm, or 1 μm. The effects in this case are the same as or similar to those of the first embodiment.

The following describes a method of manufacturing the multilayer ceramic capacitor 10. The method of manufacturing the multilayer ceramic capacitor 10 includes a first step to produce a mother multilayer body, a second step to produce a base component, and a third step to form the outer electrodes.

Figure 13:
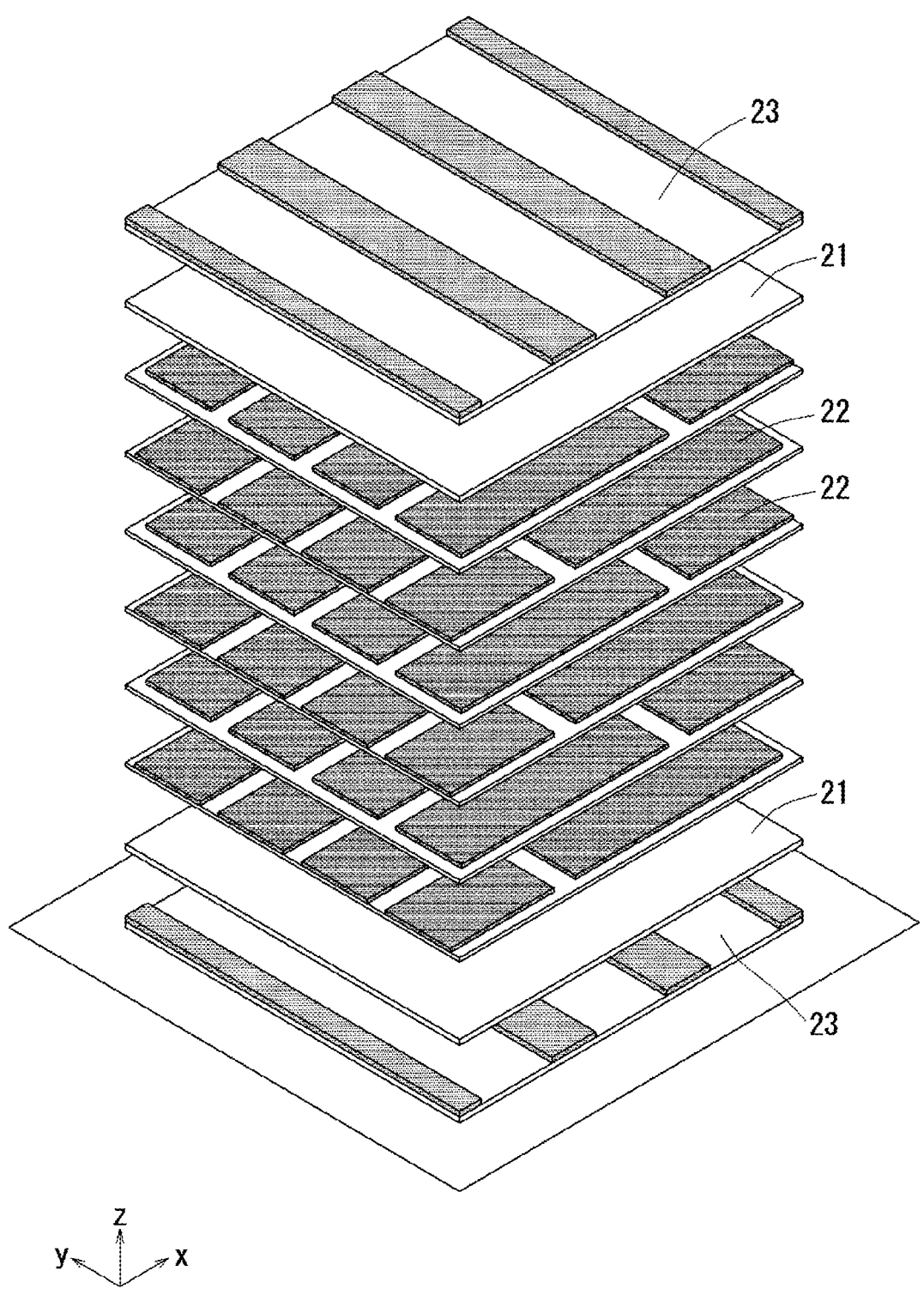
FIG. 13 is a perspective view diagram for explaining steps of producing a mother multilayer body.
Figure 14:
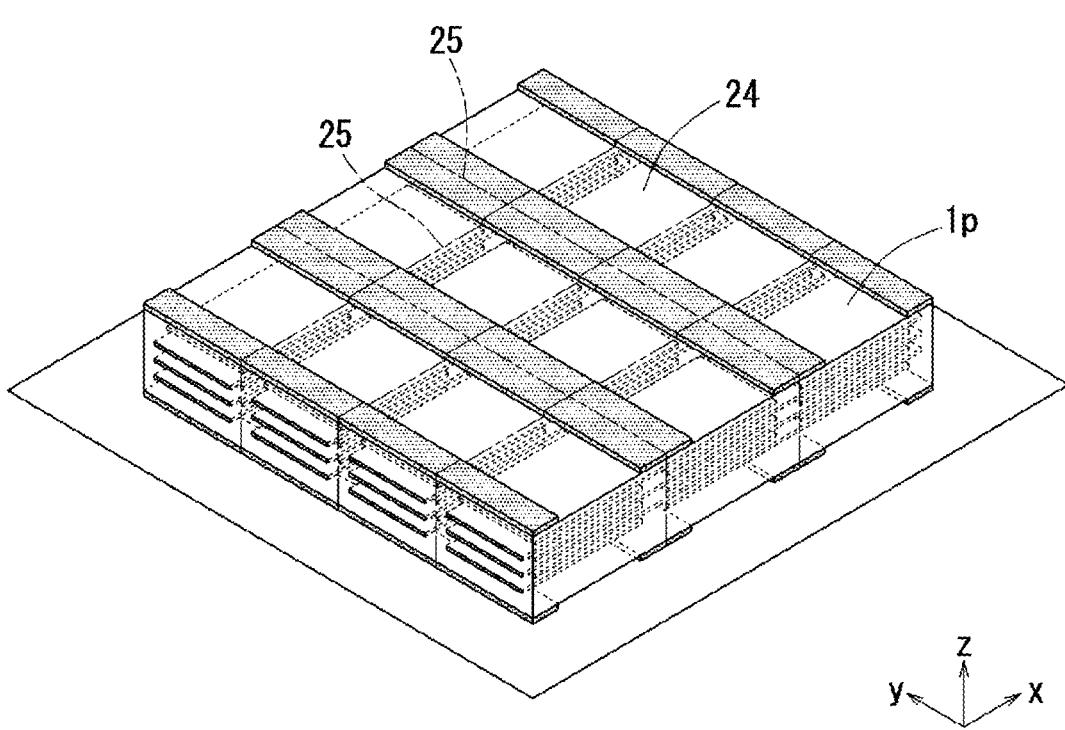
FIG. 14 is a perspective view of a mother multilayer body.
Figure 15:
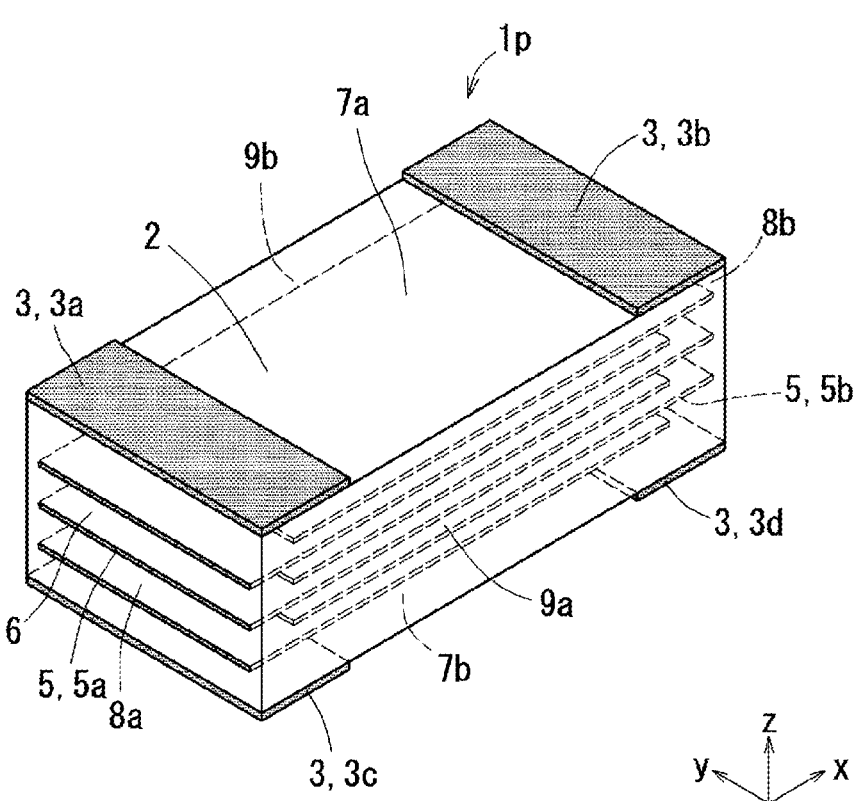
FIG. 15 is a perspective view of a base component precursor obtained by cutting the mother multilayer body in FIG. 14.

FIG. 13 is a perspective view diagram for explaining an example of steps of producing a mother multilayer body, FIG. 14 is a perspective view of an example of a mother multilayer body, and FIG. 15 is a perspective view of a base component precursor obtained by cutting the mother multilayer body in FIG. 14. In FIGS. 13 to 15, the inner electrode patterns, the underlying electrode patterns, the end portions of the inner electrode patterns exposed on surfaces of the mother multilayer body, and the end portions of the inner electrode patterns exposed on surfaces of the base component are hatched to makes it easy to understand the illustration.

(First Step)

In the first step, a mother multilayer body for forming base component precursors is produced. In the first step, first, raw material powder containing $BaTiO_3$ as a major component is prepared. Next, the prepared raw material powder is mixed with an organic vehicle to prepare a ceramic slurry. The organic vehicle used to prepare the ceramic slurry may be, for example, a solution of a resin such as a butyral-based resin dissolved in a solvent of a mixture of ethyl alcohol and toluene. Next, the prepared ceramic slurry is used to form a ceramic green sheet 21 that will become a dielectric layer 6 on a carrier film by a sheet forming method such as a die coater method, a doctor blade method, or a gravure coater method.

Next, powder containing Ni as a major component is mixed with an organic vehicle to prepare a conductivity paste. The organic vehicle used to prepare the conductivity paste may be, for example, a solution of a resin such as ethyl cellulose dissolved in a solvent of a mixture of a dihydroterpineol-based solvent and butyl cellosolve. The conductivity paste may contain, for example, a dispersant such as oleic acid or polyethylene glycol.

Next, the prepared conductivity paste is used to produce ceramic green sheets 21 on which inner electrode patterns that will become inner electrodes 5 are printed and a ceramic green sheet 21 on which underlying electrode patterns that will become underlying electrodes 3 are printed. The inner electrode patterns and the underlying electrode patterns can be printed by, for example, a printing method such as a screen printing method or a gravure printing method. In the following, a ceramic green sheet 21 on which inner electrode patterns are printed is sometimes referred to as an inner electrode sheet 22, and a ceramic green sheet 21 on which underlying electrode patterns are printed is sometimes referred to as an underlying electrode sheet 23.

Next, as illustrated in FIG. 13, a specified number of inner electrode sheets 22 are stacked on an underlying electrode sheet 23, and an underlying electrode sheet 23 is further stacked on it, so that a temporary multilayer body is produced. When the temporary multilayer body is produced, the specified number of inner electrode sheets 22 may be stacked so as to be shifted from one another in the width direction (the x-axis direction) by half of the dimension of one inner electrode pattern in the width direction. In this case, inner electrode sheets 22 on which the same inner electrode patterns are printed can be used to form the first inner electrodes 5a and the second inner electrodes 5b. One or more ceramic green sheets 21 may be provided between each underlying electrode sheet 23 and the inner electrode sheets 22. This configuration reduces the possibility of the inner electrodes 5 having different polarities being short-circuited.

Next, the temporary multilayer body is pressed in the stacking direction, so that a mother multilayer body 24 as illustrated in FIG. 14 is produced. Pressing the temporary multilayer body can be performed by using, for example, an isostatic press machine. Note that the temporary multilayer body and the mother multilayer body 24 may be produced on a support sheet (the symbol is omitted) as illustrated in FIGS. 13 and 14.

(Second Step)

In the second step, the base component 1 is produced. First, the mother multilayer body 24 is cut along cutting lines 25 in a lattice shape, so that multiple precursors of base components 1 (hereinafter also referred to as base component precursors 1p) as illustrated in FIG. 15 are produced. The mother multilayer body 24 can be cut by using, for example, a guillotine cutting machine, a dicing saw machine, or the like. Note that since the base component precursor 1p has substantially the same structure as the base component 1, the following description sometimes uses terms and reference signs such as the first surface 7a, the first end surface 8a, the underlying electrode 3, and the inner electrode 5 also for the base component precursor 1p.

Next, the base component precursors 1p are fired. Although the firing temperature may be set as appropriate depending on the ceramic material contained in the ceramic green sheets, the metal material contained in the conductivity paste, and the like, it may be, for example, approximately 1100 to 1250° C. Note that the base component precursors 1p before firing may be subjected to a degreasing treatment. The degreasing treatment may be performed in an air atmosphere, an inert gas atmosphere, or a reducing atmosphere. The degreasing treatment may be performed under atmospheric pressure or under reduced pressure. In addition, the base component precursors 1p after firing may be subjected to a reoxidation treatment.

Next, the base component precursors 1p are placed into a rotation pot containing abrasives and subjected to barrel polishing. This process removes burrs on the surfaces of the base component precursors 1p, rounds the corner portions, and sufficiently exposes the end portions of the inner electrodes 5 on the end surfaces 8a and 8b of the multilayer body 2. Thus, the base components 1 as illustrated in FIG. 2 are produced.

(Third Step)

In the third step, the outer electrodes 4 are formed on the base component 1. First, plating layers serving as the outer electrodes 4 are formed on the base component 1, for example, by using a plating method such as an electroless plating method or an electroplating method, so that a precursor of the multilayer ceramic capacitor 10 (hereinafter also referred to as a capacitor precursor) is produced. The plating layer includes a first plating layer serving as the first outer electrode 4a and a second plating layer serving as the second outer electrode 4b. In the third step, the first plating layer is formed to extend from the first end surface 8a onto the first surface 7a, the second surface 7b, the first side surface 9a, and the second side surface 9b and be connected to the multiple first inner electrodes 5a, the first underlying electrode 3a, and the third underlying electrode 3c. The second plating layer is formed to extend from the second end surface 8b onto the first surface 7a, the second surface 7b, the first side surface 9a, and the second side surface 9b and be connected to the multiple second inner electrodes 5b, the second underlying electrode 3b, and the fourth underlying electrode 3d. When the plating layers are formed, the first plating layer may be formed to completely cover the first underlying electrode 3a and the third underlying electrode 3c, and the second plating layer may be formed to completely cover the second underlying electrode 3b and the fourth underlying electrode 3d. Each of the first plating layer and the second plating layer may be composed of a single plating layer containing Cu as a major component (see FIG. 3) or may be composed of a plating layer containing Cu as a major component and one or more plating layers containing Ni, Sn, or the like as a major component (see FIG. 4).

Next, the capacitor precursor is annealed to promote the grain growth of the metal particles contained in the portions (hereinafter also referred to as the main-surface electrode portions 42, for convenience) of the plating layers located on the main surfaces 7a and 7b and connected to the underlying electrodes 3. When the annealing process is performed, heat transfer to the main-surface electrode portions 42 is set to be more efficient than heat transfer to the portions (hereinafter also referred to as the end-surface electrode portions 41, for convenience) of the plating layers located on the end surfaces 8a and 8b and connected to the inner electrodes 5. This promotes the grain growth of the metal particles in the main-surface electrode portions 42 while suppressing the grain growth of the metal particles in the end-surface electrode portions 41. This makes it possible to form the outer electrodes 4 in which the average particle diameter of the metal particles contained in the main-surface electrode portions 42 is larger than the average particle diameter of the metal particles contained in the end-surface electrode portions 41.

The annealing conditions may be, for example, a temperature rise rate of 5 to 10° C./minute, a treatment temperature of 500 to 800° C., and a temperature holding time of 0.5 to 3 hours. Note that to promote the grain growth of the metal particles in the main-surface electrode portions 42 while suppressing the grain growth of the metal particles in the end-surface electrode portions 41, the capacitor precursors are placed in an annealing furnace such that heat transfer is more efficient to the main-surface electrode portions 42 than to the end-surface electrode portions 41. Alternatively, the annealing process may be performed while the capacitor precursors are being pressed in the stacking direction. This promotes the grain growth of the metal particles in the main-surface electrode portions 42 being pressed, which in turn makes the particle diameter of the metal particles in the main-surface electrode portions 42 larger than the particle diameter of the metal particles in the end-surface electrode portions 41. To press the capacitor precursors in the stacking direction, for example, a pair of substrates or a pair of sheets are placed such that capacitor precursors are between them in the stacking direction, and the capacitor precursors are pressed in the stacking direction with the intervention of the pair of substrates or the pair of sheets. Alternatively, the annealing process may be performed in a state in which multiple capacitor precursors are placed on top of one another in the stacking direction.

The method to achieve the condition that the particle diameter of the metal particles M contained in the main-surface electrode portion 42 increases as the distance to the multilayer body 2 decreases, in the main-surface electrode portion 42 is not particularly limited. For example, as already mentioned, Cu may be used for the material of the outer electrode 4, Ni may be used for the material of the underlying electrode 3, an annealing process may be performed to alloy Cu with Ni and cause the grain growth at the interface between the two electrodes. Note that since only partial regions of the end-surface electrode portion 41 are in contact with the inner electrodes 5 in this process, the condition that the particle diameter increases as the distance to the multilayer body 2 decreases can be achieved only in the main-surface electrode portion 42 even when the material of the inner electrodes 5 is Ni. Additionally/alternatively, the type, conditions, and other factors of the plating method may be changed when the outer electrodes 4 are formed to include two or more plating layers so that the particle diameter is larger in the layer closer to the multilayer body 2. In this process, the condition that the particle diameter increases as the distance to the multilayer body 2 decreases can be achieved only in the main-surface electrode portions 42 by performing at least part of the steps of forming the plating layers separately for the end-surface electrode portions 41 and the main-surface electrode portions 42.

The method to achieve the condition that the particle diameter of the metal particles M contained in the end-surface electrode portion 41 decreases as the distance to the multilayer body 2 decreases, in the end-surface electrode portion 41 is not particularly limited. For example, grain growth may be promoted more on the outer surface side than on the inner surface side in the annealing process by setting the temperature of the outer surface of the end-surface electrode portion 41 higher than the temperature of the inner surface. Additionally/alternatively, the type, conditions, and other factors of the plating method may be changed when the outer electrodes 4 (at least the end-surface electrode portions 41) are formed to include two or more plating layers so that the particle diameter is smaller in the layer closer to the multilayer body 2.

The method to achieve the condition that the average particle diameter of the metal particles contained in the underlying electrode 3 is larger than the average particle diameter of the metal particles contained in the inner electrode 5 is not particularly limited. For example, in the same or a similar manner for the outer electrodes 4, heating may be performed such that the grain growth in the underlying electrodes 3 is promoted more than the grain growth in the inner electrodes 5. Additionally/alternatively, the conductive paste that will become the underlying electrodes 3 may contain metal particles having larger particle diameters than the metal particles contained in the conductive paste that will become the inner electrodes 5.

The multilayer ceramic capacitor 10 of the first embodiment can be manufactured as described above. The multilayer ceramic capacitor 10A of the second embodiment can be manufactured by the same or a similar manufacturing method as the multilayer ceramic capacitor 10.

Although the embodiments of the present disclosure have been described in details as above, the present disclosure is not limited to the embodiments described above. Various changes, improvements, and the like can be made within a scope not departing from the spirit of the present disclosure.

The multilayer electronic component of the present disclosure may be, for example, a multilayer ceramic capacitor of a third embodiment illustrated in FIGS. 16 to 19, and a multilayer ceramic capacitor of a fourth embodiment illustrated in FIGS. 20 to 23. The following describes multilayer ceramic capacitors of the third embodiment and the fourth embodiment.

Figure 16:
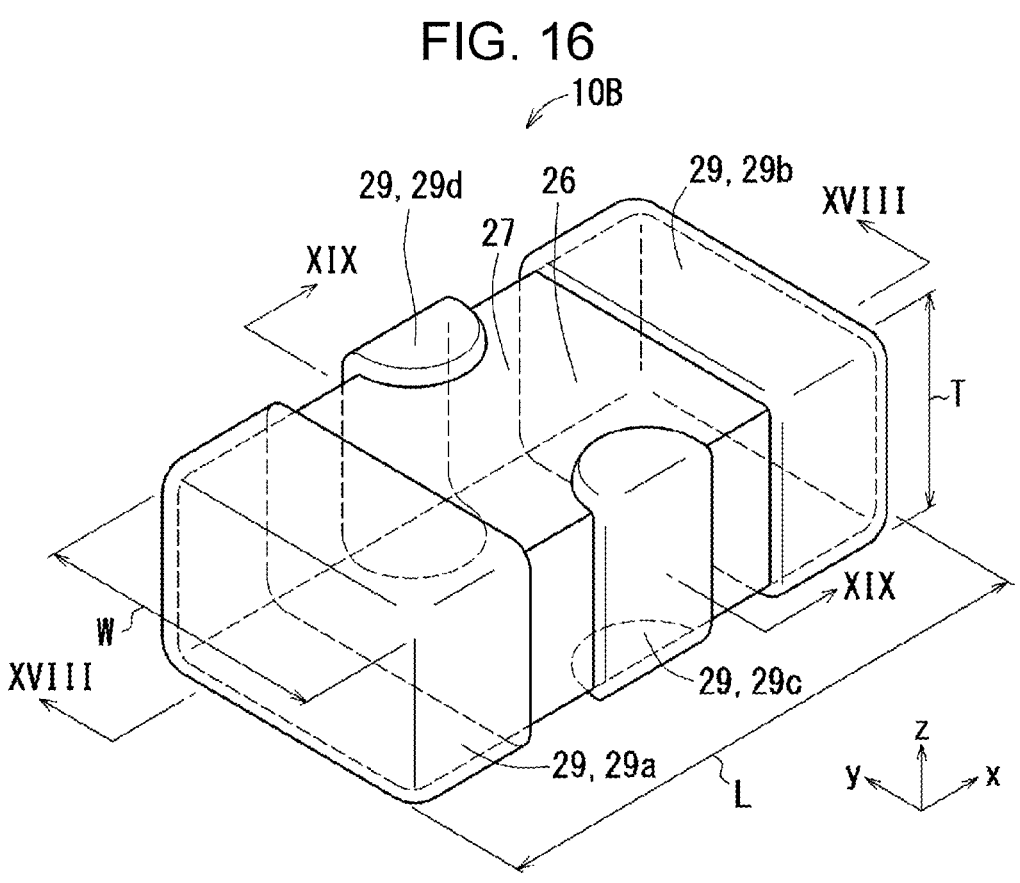
FIG. 16 is a perspective view of a multilayer ceramic capacitor of a third embodiment.
Figure 17:
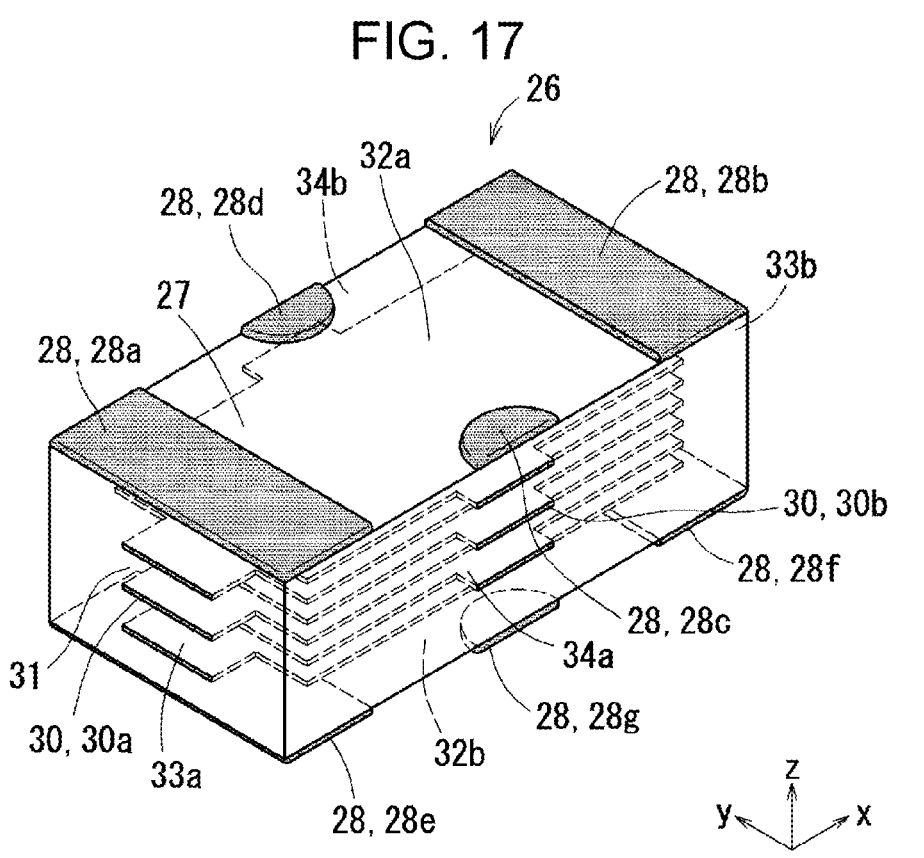
FIG. 17 is a perspective view of a base component of the multilayer ceramic capacitor in FIG. 16.
Figure 18:
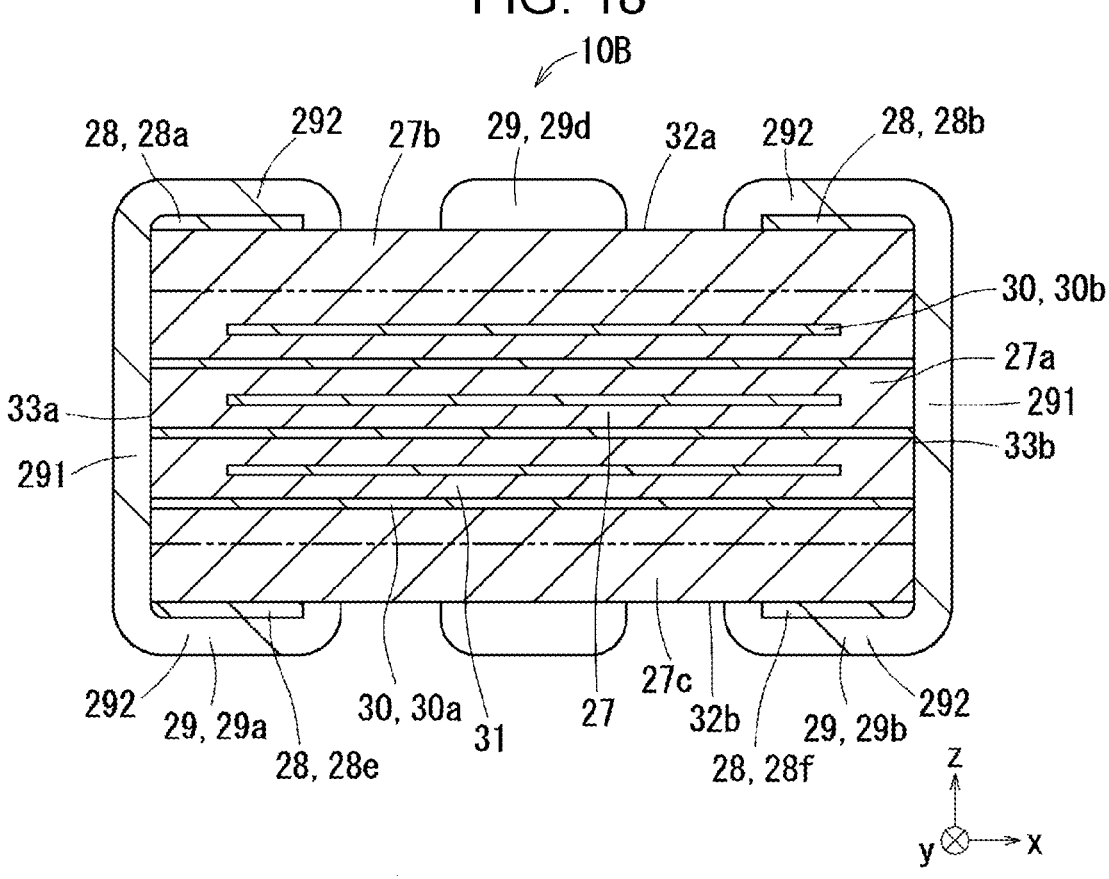
FIG. 18 is a diagram illustrating an example of a cross section taken along cross-section line XVIII-XVIII in FIG. 16.
Figure 19:
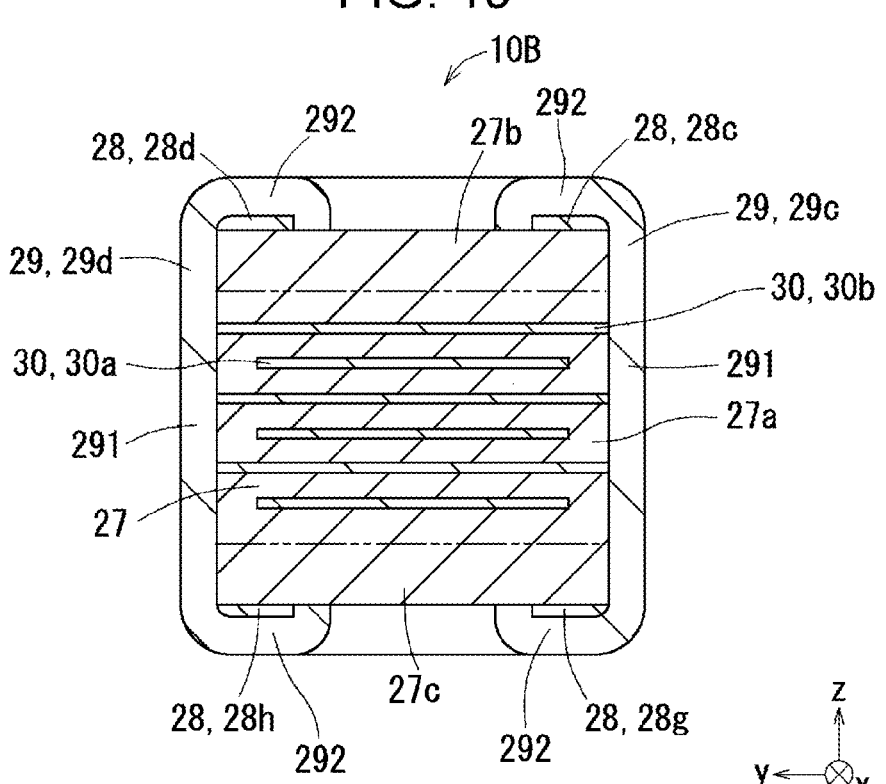
FIG. 19 is a diagram illustrating an example of a cross section taken along cross-section line XIX-XIX in FIG. 16.
Figure 20:
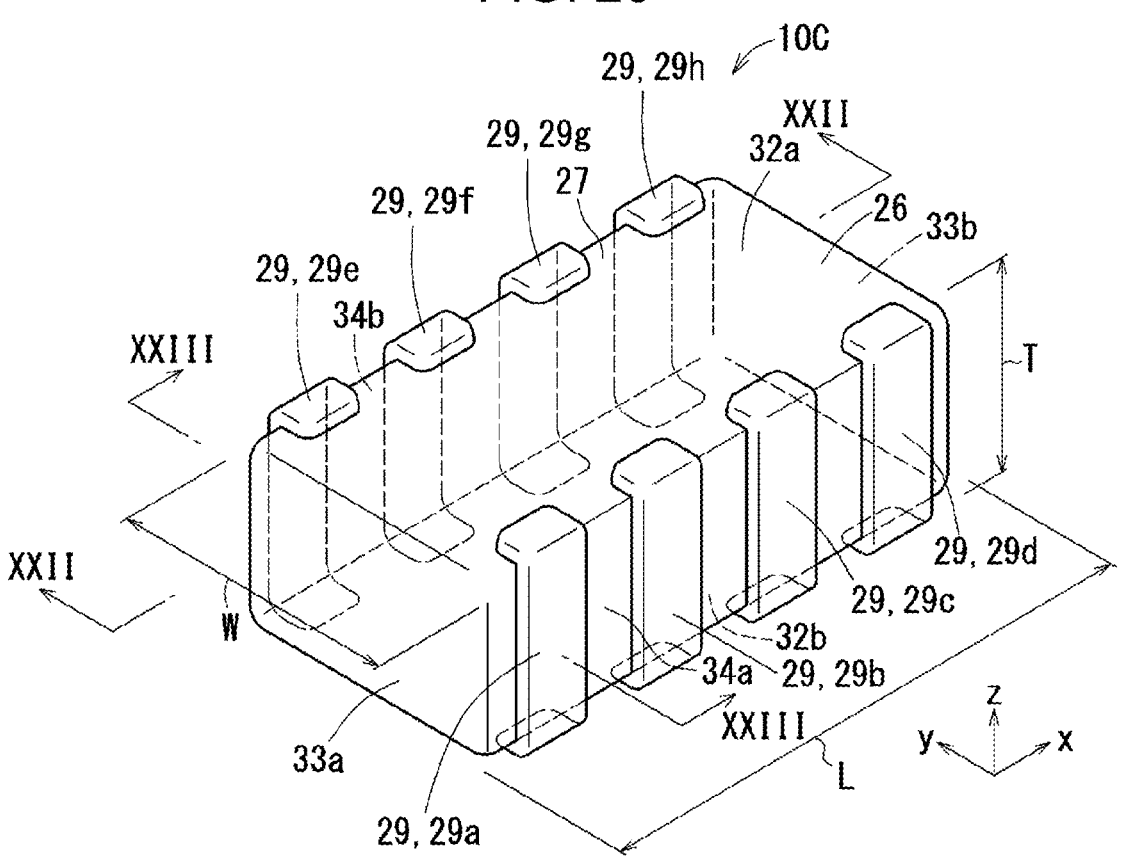
FIG. 20 is a perspective view of a multilayer ceramic capacitor of a fourth embodiment.
Figure 21:
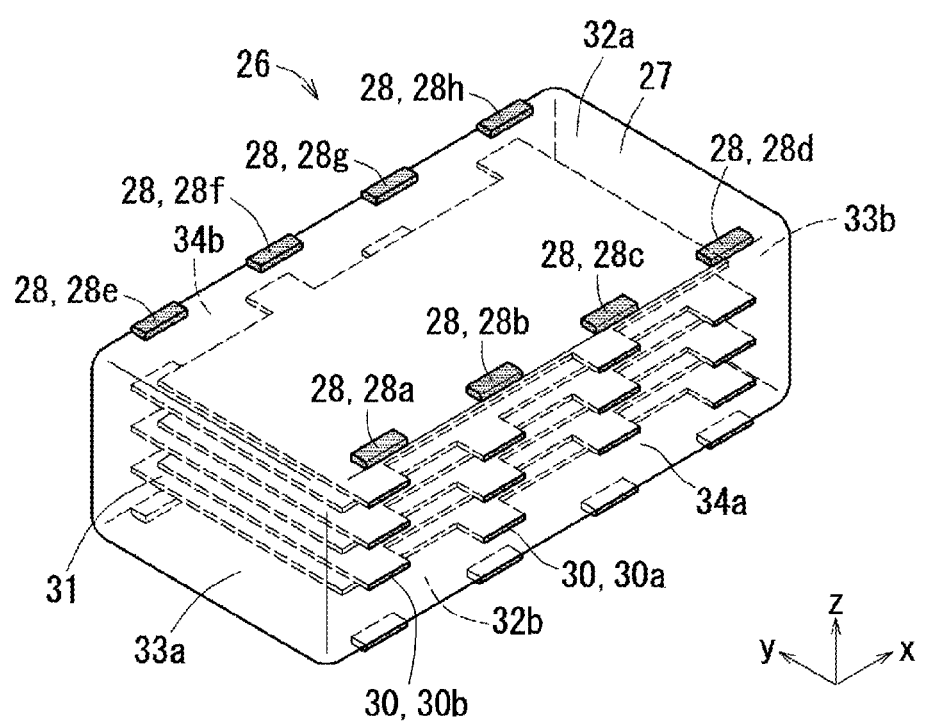
FIG. 21 is a perspective view of a base component of the multilayer ceramic capacitor in FIG. 20.
Figure 22:
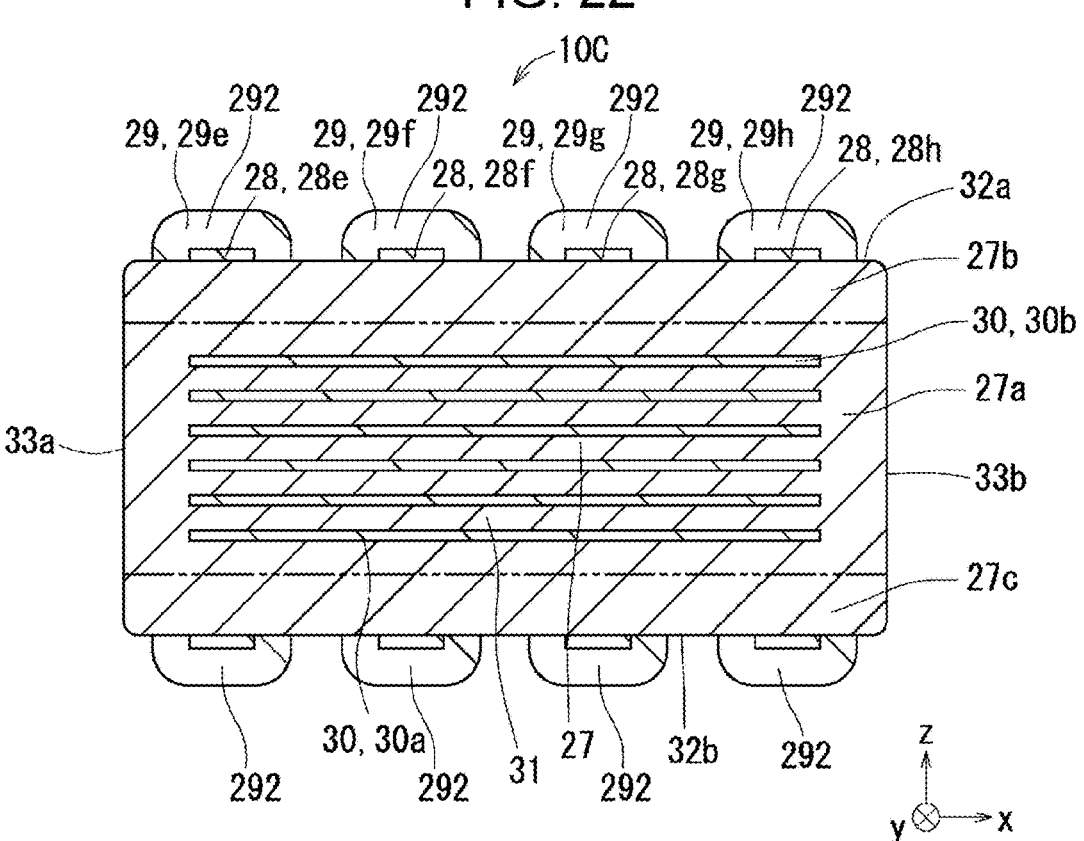
FIG. 22 is a diagram illustrating an example of a cross section taken along cross-section line XXII-XXII in FIG. 20.
Figure 23:
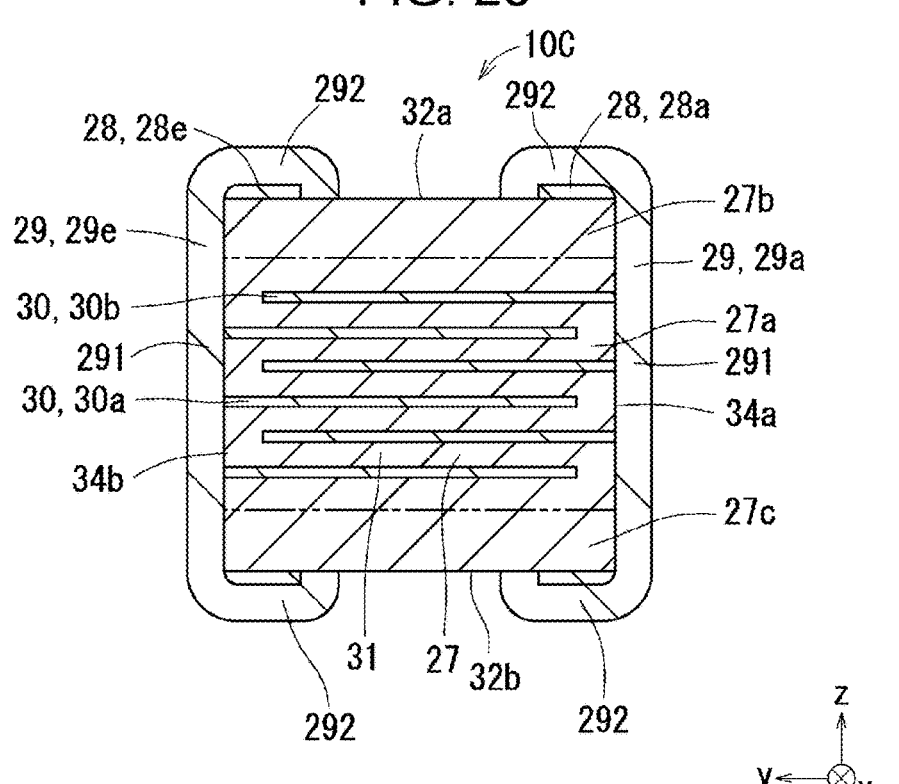
FIG. 23 is a diagram illustrating an example of a cross section taken along cross-section line XXIII-XXIII in FIG. 20.

FIG. 16 is a perspective view of a multilayer ceramic capacitor of the third embodiment, FIG. 17 is a perspective view of a base component of the multilayer ceramic capacitor in FIG. 16, FIG. 18 is a diagram illustrating an example of a cross section taken along cross-section line XVIII-XVIII in FIG. 16, and FIG. 19 is a diagram illustrating an example of a cross section taken along cross-section line XIX-XIX in FIG. 16. FIG. 20 is a perspective view of a multilayer ceramic capacitor of the fourth embodiment, FIG. 21 is a perspective view of a base component of the multilayer ceramic capacitor in FIG. 20, FIG. 22 is a diagram illustrating an example of a cross section taken along cross-section line XXII-XXII in FIG. 20, and FIG. 23 is a diagram illustrating an example of a cross section taken along cross-section line XXIII-XXIII in FIG. 20.

As illustrated in FIG. 16, a multilayer ceramic capacitor 10B of the third embodiment includes a base component 26 and multiple outer electrodes 29. As illustrated in FIG. 17, the base component 26 includes a multilayer body 27 and multiple underlying electrodes 28. The multilayer ceramic capacitor 10B may be a thin multilayer ceramic capacitor in which the dimension T in the height direction (the z-axis direction) is smaller than the dimension L in the longitudinal direction (the x-axis direction) and the dimension W in the width direction (the y-axis direction).

The multilayer body 27 includes multiple inner electrodes 30 and multiple dielectric layers 31 alternately stacked. The multilayer body 27 may have an approximately rectangular parallelepiped shape. The multilayer body 27 includes a first surface 32a and a second surface 32b opposed to each other in the stacking direction, a first end surface 33a and a second end surface 33b opposed to each other in the longitudinal direction, and a first side surface 34a and a second side surface 34b opposed to each other in the width direction.

The dielectric layers 31 are composed of, for example, a ceramic material containing $BaTiO_3$, $CaTiO_3$, $SrTiO_3$, $BaZrO_3$, $CaZrO_3$, or the like as a major component. The ceramic material may contain, for example, a Mn compound, a Mg compound, a Si compound, a Co compound, a Ni compound, a rare-earth compound, or the like as a minor component. Each dielectric layer 31 may have a thickness of, for example, approximately 0.1 to 1.0 μm.

As illustrated in FIGS. 17 to 19, the multiple inner electrodes 30 include multiple first inner electrodes 30a and multiple second inner electrodes 30b. Each first inner electrode 30a has end portions exposed on the first end surface 33a and the second end surface 33b. Each second inner electrode 30b has end portions exposed on the first side surface 34a and the second side surface 34b. The first inner electrodes 30a and the second inner electrodes 30b have different polarities.

The inner electrodes 30 are composed of, for example, a metal material containing Ni, Cu, Sn, or the like as a major component. The inner electrodes 30 may contain, for example, a ceramic material such as $BaTiO_3$, $CaTiO_3$, $SrTiO_3$, $BaZrO_3$, or $CaZrO_3$. Each inner electrode 30 may have a thickness of, for example, approximately 0.1 to 1.0 μm.

As illustrated in FIGS. 18 and 19, the multilayer body 27 may include a capacitive portion 27*a* and cover portions 27*b* and 27*c*. The capacitive portion 27*a* includes the multiple inner electrodes 30 and the multiple dielectric layers 31 alternately stacked and has capacitance. The cover portions 27*b* and 27*c* are located at both ends of the capacitive portion 27*a* in the stacking direction. Each of the cover portions 27*b* and 27*c* is composed of one or more dielectric layers and need not have capacitance.

The cover portions 27*b* and 27*c* (their dielectric layers) are composed of, for example, a ceramic material containing $BaTiO_3$, $CaTiO_3$, $SrTiO_3$, $BaZrO_3$, $CaZrO_3$, or the like as a major component. The cover portions 27*b* and 27*c* may be compose of the same ceramic material as the dielectric layers 31.

The multiple underlying electrodes 28 include a first underlying electrode 28*a*, a second underlying electrode 28*b*, a third underlying electrode 28*c*, and a fourth underlying electrode 28*d*. The first underlying electrode 28*a* is located on the first surface 32*a* and close to the first end surface 33*a*, and the second underlying electrode 28*b* is located on the first surface 32*a* and close to the second end surface 33*b*. The third underlying electrode 28*c* is located on the first surface 32*a* and close to the first side surface 34*a*, and the fourth underlying electrode 28*d* is located on the first surface 32*a* and close to the second side surface 34*b*. The third underlying electrode 28*c* and the fourth underlying electrode 28*d* may be located at center portions of the first surface 32*a* in the longitudinal direction. The third underlying electrode 28*c* and the fourth underlying electrode 28*d* may have, for example, an approximately semicircular shape, an approximately rectangular shape, an approximately triangular shape, or other shapes in plan view.

The underlying electrodes 28 may include a fifth underlying electrode 28*e*, a sixth underlying electrode 28*f*, a seventh underlying electrode 28*g*, and an eighth underlying electrode 28*h*. The fifth underlying electrode 28*e* is located on the second surface 32*b* and close to the first end surface 33*a*, and the sixth underlying electrode 28*f* is located on the second surface 32*b* and close to the second end surface 33*b*. The seventh underlying electrode 28*g* is located on the second surface 32*b* and close to the first side surface 34*a*, and the eighth underlying electrode 28*h* is located on the second surface 32*b* and close to the second side surface 34*b*. The fifth to eighth underlying electrodes 28*e* to 28*h* may have the same or similar configurations as the first to fourth underlying electrodes 28*a* to 28*d* except that they are located on the second surface 32*b*.

As illustrated in FIG. 16, the multiple outer electrodes 29 include a first outer electrode 29*a*, a second outer electrode 29*b*, a third outer electrode 29*c*, and a fourth outer electrode 29*d*.

The first outer electrode 29*a* extends from the first end surface 33*a* at least onto the first surface 32*a* and is connected to the multiple first inner electrodes 30*a* and the first underlying electrode 28*a*. The first outer electrode 29*a* may cover the first underlying electrode 28*a*. The first outer electrode 29*a* may extend from the first end surface 33*a* onto the first surface 32*a* and the second surface 32*b* and be connected to the multiple first inner electrodes 30*a*, the first underlying electrode 28*a*, and the fifth underlying electrode 28*e*. The first outer electrode 29*a* may cover the first underlying electrode 28*a* and the fifth underlying electrode 28*e*. The first outer electrode 29*a* may extend from the first end surface 33*a* onto the first surface 32*a*, the second surface 32*b*, the first side surface 34*a*, and the second side surface 34*b*.

The second outer electrode 29*b* extends from the second end surface 33*b* at least onto the first surface 32*a* and is connected to the multiple second inner electrodes 30*b* and the second underlying electrode 28*b*. The second outer electrode 29*b* may cover the second underlying electrode 28*b*. The second outer electrode 29*b* may extend from the second end surface 33*b* onto the first surface 32*a* and the second surface 32*b* and be connected to the multiple second inner electrodes 30*b*, the second underlying electrode 28*b*, and the sixth underlying electrode 28*f*. The second outer electrode 29*b* may cover the second underlying electrode 28*b* and the sixth underlying electrode 28*f*. The second outer electrode 29*b* may extend from the second end surface 33*b* onto the first surface 32*a*, the second surface 32*b*, the first side surface 34*a*, and the second side surface 34*b*.

The third outer electrode 29*c* extends from the first side surface 34*a* at least onto the first surface 32*a* and is connected to the multiple second inner electrodes 30*b* and the third underlying electrode 28*c*. The third outer electrode 29*c* may cover the third underlying electrode 28*c*. The third outer electrode 29*c* may extend from the first side surface 34*a* to the first surface 32*a* and the second surface 32*b* and be connected to the multiple second inner electrodes 30*b*, the third underlying electrode 28*c*, and the seventh underlying electrode 28*g*. The third outer electrode 29*c* may cover the third underlying electrode 28*c* and the seventh underlying electrode 28*g*.

The fourth outer electrode 29*d* extends from the second side surface 34*b* at least onto the first surface 32*a* and is connected to the multiple second inner electrodes 30*b* and the fourth underlying electrode 28*d*. The fourth outer electrode 29*d* may cover the fourth underlying electrode 28*d*. The fourth outer electrode 29*d* may extend from the second side surface 34*b* onto the first surface 32*a* and the second surface 32*b* and be connected to the multiple second inner electrodes 30*b*, the fourth underlying electrode 28*d*, and the eighth underlying electrode 28*h*. The fourth outer electrode 29*d* may cover the fourth underlying electrode 28*d* and the eighth underlying electrode 28*h*.

Each outer electrode 29 may be composed of a plating layer formed on the multilayer body 27 by a direct plating method. Each outer electrode 29 may be composed of two or more plating layers. Each outer electrode 29 may be composed of a first layer connected to the corresponding underlying electrodes 28 and inner electrodes 30 and a second layer covering the first layer. Each outer electrode 29 may be composed of a first layer connected to the corresponding underlying electrodes 28 and inner electrodes 30, a second layer covering the first layer, and a third layer covering the second layer. In this case, the first layer may be formed by a direct plating method.

Each of the first to fourth outer electrodes 29*a* to 29*d* includes a first portion 291 and a second portion 292. Each first portion 291 is located on the first end surface 33*a*, the second end surface 33*b*, the first side surface 34*a*, or the second side surface 34*b* of the multilayer body 27 and connected to the multiple first inner electrodes 30*a* or the multiple second inner electrodes 30*b*. Each second portion 292 is located on the first surface 32*a* or the second surface 32*b* of the multilayer body 27 and connected to one of the first to fourth underlying electrodes 28*a* to 28*d*. Each second portion 292 may cover one of the first to fourth underlying electrodes 28*a* to 28*d*. Each outer electrode 29 may further include a second portion 292 located on the second surface 32b and connected to one of the fifth to eighth underlying electrodes 28e to 28h. The second portion 292 may cover one of the fifth to eighth underlying electrodes 28e to 28h. The first portions 291 are also referred to as the end-surface electrode portions, and the second portions 292 are also referred to as the main-surface electrode portions.

A multilayer ceramic capacitor according to a fourth embodiment will be described. In the following description, the same or similar components as in the multilayer ceramic capacitor of the third embodiment are referred to as the same terms and denoted by the same reference signs, and detailed description thereof is omitted.

As illustrated in FIG. 20, a multilayer ceramic capacitor 10C of the fourth embodiment includes a base component 26 and multiple outer electrodes 29. As illustrated in FIG. 21, the base component 26 includes a multilayer body 27 and multiple underlying electrodes 28. The multilayer ceramic capacitor 10C may be a thin multilayer ceramic capacitor in which the dimension T in the height direction (the z-axis direction) is smaller than the dimension L in the longitudinal direction (the x-axis direction) and the dimension W in the width direction (the y-axis direction).

As illustrated in FIGS. 21 to 23, the multilayer body 27 includes multiple inner electrodes 30 and multiple dielectric layers 31 alternately stacked. The multilayer body 27 may have an approximately rectangular parallelepiped shape. The multilayer body 27 includes a first surface 32a and a second surface 32b opposed to each other in the stacking direction, a first end surface 33a and a second end surface 33b opposed to each other in the longitudinal direction, and a first side surface 34a and a second side surface 34b opposed to each other in the width direction.

As illustrated in FIGS. 21 to 23, the multiple inner electrodes 30 include multiple first inner electrodes 30a and multiple second inner electrodes 30b.

Each first inner electrode 30a has multiple end portions exposed on the first side surface 34a and multiple end portions exposed on the second side surface 34b. Each second inner electrode 30b has multiple end portions exposed on the first side surface 34a and multiple end portions exposed on the second side surface 34b. On the first side surface 34a, the positions of the multiple portions where the first inner electrodes 30a are exposed differ in the longitudinal direction from the positions of the multiple portions where the second inner electrodes 30b are exposed. On the second side surface 34b, the positions of the multiple portions where the first inner electrodes 30a are exposed differ in the longitudinal direction from the positions of the multiple portions where the second inner electrodes 30b are exposed. The first inner electrodes 30a and the second inner electrodes 30b have different polarities.

As illustrated in FIGS. 22 and 23, the multilayer body 27 may include a capacitive portion 27a and cover portions 27b and 27c. The capacitive portion 27a includes the multiple inner electrodes 30 and the multiple dielectric layers 31 alternately stacked and has capacitance. The cover portions 27b and 27c are located at both ends of the capacitive portion 27a in the stacking direction. Each of the cover portions 27b and 27c is composed of one or more dielectric layers and need not have capacitance.

The multiple underlying electrodes 28 include a first underlying electrode 28a, a second underlying electrode 28b, a third underlying electrode 28c, a fourth underlying electrode 28d, a fifth underlying electrode 28e, a sixth underlying electrode 28f, a seventh underlying electrode 28g, and an eighth underlying electrode 28h. The first to fourth underlying electrodes 28a to 28d are located on the first surface 32a and close to the first side surface 34a. The fifth to eighth underlying electrodes 28e to 28h are located on the first surface 32a and close to the second side surface 34b.

The underlying electrodes 28 may include ninth to sixteenth underlying electrodes. The ninth to twelfth underlying electrodes are located on the second surface 32b and close to the first side surface 34a. The thirteenth to sixteenth underlying electrodes are located on the second surface 32b and close to the second side surface 34b. The ninth to twelfth underlying electrodes may have the same or similar configurations as the first to fourth underlying electrodes 28a to 28d except that they are located on the second surface 32b. The thirteenth to sixteenth underlying electrodes may have the same or similar configurations as the fifth to eighth underlying electrodes 28e to 28h except that they are located on the second surface 32b.

As illustrated in FIG. 20, the multiple outer electrodes 29 include a first outer electrode 29a, a second outer electrode 29b, a third outer electrode 29c, a fourth outer electrode 29d, a fifth outer electrode 29e, a sixth outer electrode 29f, a seventh outer electrode 29g, and an eighth outer electrode 29h.

The first outer electrode 29a and the third outer electrode 29c extend from the first side surface 34a at least onto the first surface 32a and are connected to the multiple second inner electrodes 30b. The first outer electrode 29a and the third outer electrode 29c are connected to the first underlying electrode 28a and the third underlying electrode 28c, respectively. The first outer electrode 29a and the third outer electrode 29c may cover the first underlying electrode 28a and the third underlying electrode 28c, respectively. The first outer electrode 29a may extend from the first side surface 34a onto the first surface 32a and the second surface 32b and be connected to the first underlying electrode 28a and the ninth underlying electrode. The first outer electrode 29a may cover the first underlying electrode 28a and the ninth underlying electrode. The third outer electrode 29c may extend from the first side surface 34a onto the first surface 32a and the second surface 32b and be connected to the third underlying electrode 28c and the eleventh underlying electrode. The third outer electrode 29c may cover the third underlying electrode 28c and the eleventh underlying electrode.

The second outer electrode 29b and the fourth outer electrode 29d extend from the first side surface 34a at least onto the first surface 32a and are connected to the multiple first inner electrodes 30a. The second outer electrode 29b and the fourth outer electrode 29d are connected to the second underlying electrode 28b and the fourth underlying electrode 28d, respectively. The second outer electrode 29b and the fourth outer electrode 29d may cover the second underlying electrode 28b and the fourth underlying electrode 28d, respectively. The second outer electrode 29b may extend from the first side surface 34a onto the first surface 32a and the second surface 32b and be connected to the second underlying electrode 28b and the tenth underlying electrode. The second outer electrode 29b may cover the second underlying electrode 28b and the tenth underlying electrode. The fourth outer electrode 29d may extend from the first side surface 34a onto the first surface 32a and the second surface 32b and be connected to the fourth underlying electrode 28d and the twelfth underlying electrode. The fourth outer electrode 29d may cover the fourth underlying electrode 28d and the twelfth underlying electrode.

The sixth outer electrode 29f and the eighth outer electrode 29h extend from the second side surface 34b at least onto the first surface 32a and are connected to the multiple second inner electrodes 30b. The sixth outer electrode 29f and the eighth outer electrode 29h are connected to the sixth underlying electrode 28f and the eighth underlying electrode 28h, respectively. The sixth outer electrode 29f and the eighth outer electrode 29h may cover the sixth underlying electrode 28f and the eighth underlying electrode 28h, respectively. The sixth outer electrode 29f may extend from the second side surface 34b onto the first surface 32a and the second surface 32b and be connected to the sixth underlying electrode 28f and the fourteenth underlying electrode. The sixth outer electrode 29f may cover the sixth underlying electrode 28f and the fourteenth underlying electrode. The eighth outer electrode 29h may extend from the second side surface 34b to the first surface 32a and the second surface 32b and be connected to the eighth underlying electrode 28h and the sixteenth underlying electrode. The eighth outer electrode 29h may cover the eighth underlying electrode 28h and the sixteenth underlying electrode.

The fifth outer electrode 29e and the seventh outer electrode 29g extend from the second side surface 34b at least onto the first surface 32a and are connected to the multiple first inner electrodes 30a. The fifth outer electrode 29e and the seventh outer electrode 29g are connected to the fifth underlying electrode 28e and the seventh underlying electrode 28g, respectively. The fifth outer electrode 29e and the seventh outer electrode 29g may cover the fifth underlying electrode 28e and the seventh underlying electrode 28g, respectively. The fifth outer electrode 29e may extend from the second side surface 34b onto the first surface 32a and the second surface 32b and be connected to the fifth underlying electrode 28e and the thirteenth underlying electrode. The fifth outer electrode 29e may cover the fifth underlying electrode 28e and the thirteenth underlying electrode. The seventh outer electrode 29g may extend from the second side surface 34b onto the first surface 32a and the second surface 32b and be connected to the seventh underlying electrode 28g and the fifteenth underlying electrode. The seventh outer electrode 29g may cover the seventh underlying electrode 28g and the fifteenth underlying electrode.

Each of the first to eighth outer electrodes 29a to 29h includes a first portion 291 and a second portion 292. Each first portion 291 is located on the first side surface 34a or the second side surface 34b and connected to the multiple first inner electrodes 30a or the multiple second inner electrodes 30b. Each second portion 292 is located on the first surface 32a and connected to one of the first to eighth underlying electrodes 28a to 28h. Each second portion 292 may cover one of the first to eighth underlying electrodes 28a to 28h. Each outer electrode 29 may further include a second portion 292 located on the second surface 32b and connected to one of the ninth to sixteenth underlying electrodes. The second portion 292 may cover one of the ninth to sixteenth underlying electrodes. The first portions 291 are also referred to as the end-surface electrode portions, and the second portions 292 are also referred to as the main-surface electrode portions.

The following describes the configuration of the end-surface electrode portion 291 and the main-surface electrode portion 292 of the multilayer ceramic capacitors 10B and 10C. The description of the configurations of the end-surface electrode portion 41 and the main-surface electrode portion 42 in the multilayer ceramic capacitor 10 may be applied to those of the multilayer ceramic capacitors 10B and 10C unless a contradiction or the like occurs. The following is a brief explanation, for reference.

The outer electrodes 29 contain metal particles M. The multilayer ceramic capacitors 10B and 10C have a configuration in which the average particle diameter of the metal particles M contained in the end-surface electrode portion 291 is smaller than the average particle diameter of the metal particles M contained in the main-surface electrode portion 292.

The average particle diameter of the metal particles M contained in the end-surface electrode portion 291 may be, for example, 0.3 to 0.8 µm, or 0.5 to 0.6 µm. The average particle diameter of the metal particles M contained in the main-surface electrode portion 292 may be, for example, 0.3 to 1.3 µm, or 0.6 to 1.0 µm.

The underlying electrodes 28 and the inner electrodes 30 may contain Ni as a major component, and the outer electrodes 29 may contain Cu as a major component.

The average particle diameter of the metal particles M in the end-surface electrode portion 291, at position P a specified distance L1 away from the surface on the multilayer body 27 side may be smaller than the average particle diameter of the metal particles M in the main-surface electrode portion 292, at position Q the specified distance L1 away from the surface on the multilayer body 27 side (see FIGS. 5 and 6). The specified distance L1 may be, for example, 0.5 to 1.5 µm, or 1 µm.

The average particle diameter of the metal particles M contained in the main-surface electrode portion 292 may be 1.1 to 2.7 times the average particle diameter of the metal particles M contained in the end-surface electrode portion 291.

In the end-surface electrode portion 291, the particle diameter of the metal particles M contained in the end-surface electrode portion 291 may decrease as the distance to the multilayer body 27 decreases.

In the main-surface electrode portion 292, the particle diameter of the metal particles M contained in the main-surface electrode portion 292 may increase as the distance to the multilayer body 27 decreases.

The multilayer ceramic capacitors 10B and 10C may have a configuration in which the average particle diameter of the metal particles contained in the underlying electrode 28 is larger than the average particle diameter of the metal particles contained in the inner electrode 30.

The multilayer ceramic capacitors 10B and 10C may have a configuration in which the average particle diameter of the metal particles in the underlying electrode 28, at position S a specified distance L' away from the surface of the underlying electrode 28 opposite to the surface on the multilayer body 27 side is larger than the average particle diameter of the metal particles in the inner electrode 30, at position R the distance L' away from the surface of the multilayer body 27 (see FIGS. 5 and 6). The specified distance L' may be, for example, 0.5 to 1.5 µm, or 1 µm.

Although not specifically illustrated, still other embodiments will be described. Note that symbols used in the first to fourth embodiments are used in some cases in the following description, for convenience. The following description may be applied to embodiments other than the embodiment from which symbols are used, unless a contradiction or the like occurs.

Underlying electrodes 13 may be embedded into the multilayer body 12 (more specifically, the cover portions 12b and 12c) with their upper surfaces or lower surfaces exposed to the outside of the multilayer body 12. In other words, the underlying electrodes 13 may be sunk into the cover portions 12b and 12c. From a different perspective, the first surface 17a and the second surface 17b of the multilayer body 12 need not be flat and may be recessed at the positions of the underlying electrodes 13. For convenience, the following description focuses on underlying electrodes 13 on the upper surface of the multilayer body 12. The upper surfaces of the embedded underlying electrodes 13 may be flush with or higher than the surface of the region of the first surface 17*a* where the underlying electrodes 13 are not present.

Note that even when the underlying electrodes 13 are embedded as described above, it can be said that the underlying electrodes 13 are located on the first surface 17*a* or the second surface 17*b*. In other words, the bottom surfaces of the recesses where the underlying electrodes 13 are located are part of the first surface 17*a* or the second surface 17*b* in the multilayer body 12.

The method of producing the embedded underlying electrodes 13 as mentioned above is not particularly limited. For example, in an example of the upper surface side, the cover portion 12*b* may be produced by using two-layer ceramic green sheets. Underlying electrodes 13 precursors are printed onto the ceramic green sheet for the lower layer. Cutouts are formed in the ceramic green sheet for the upper layer at positions where the underlying electrodes 13 are located. With this process, the embedded underlying electrodes 13 are produced. Additionally or alternatively, underlying electrode 13 precursors may be sunk into ceramic green sheets by pressing.

A capacitor may have an exterior resin that covers the entire structure illustrated as an example in FIG. 1 and lead wires connected to the outer electrodes and extending from the exterior resin. From a different perspective, a capacitor may be for through-hole mounting instead of surface mounting.

The two types of inner electrodes connected to mutually different outer electrodes may be alternately stacked two by two, instead of one by one. In this case, for example, the dielectric layer between two inner electrodes connected to the same outer electrode and opposed to each other may be thinner than the dielectric layer between two inner electrodes connected to different outer electrodes and opposed to each other. As can be understood from the explanation above, multiple dielectric layers are not limited to ones having the same shape and size.

Two types of inner electrodes connected to mutually different outer electrodes are not limited to ones opposed to each other. For example, two types of inner electrodes connected to mutually different outer electrodes may be provided in the same layer, and an inner electrode opposed to the two types of inner electrodes mentioned above may be provided, so that a circuit including two parallel flat-plate capacitors connected in series can be formed. Alternatively, a circuit including three or more parallel flat-plate capacitors connected in series may be formed.

In the first embodiment, since the inner electrodes 5 are within the width (the y direction) of the dielectric layers 6, the inner electrodes 5 are not exposed from the side surfaces 9*a* and 9*b* of the multilayer body 2. However, a configuration in which the inner electrodes 5 are not exposed may be achieved by overlaying dielectric layers on the side surfaces 9*a* and 9*b*. From a different perspective, the entire base component 1 need not be in a stacked structure.

The present disclosure can be implemented in the following aspects (1) to (11).

(1) A multilayer electronic component including:
a multilayer body including multiple inner electrodes and multiple dielectric layers alternately stacked, and including a first surface and a second surface opposed to each other in a stacking direction, a first end surface and a second end surface opposed to each other in a longitudinal direction orthogonal to the stacking direction, and a first side surface and a second side surface opposed to each other in a width direction orthogonal to the stacking direction and the longitudinal direction;
multiple underlying electrodes; and
multiple outer electrodes, in which the multiple inner electrodes include:
   multiple first inner electrodes exposed on the first end surface; and
   multiple second inner electrodes exposed on the second end surface,
the multiple underlying electrodes include:
   a first underlying electrode located on the first surface and close to the first end surface; and
   a second underlying electrode located on the first surface and close to the second end surface,
the multiple outer electrodes include:
   a first outer electrode extending from the first end surface at least onto the first surface and connected to the multiple first inner electrodes and the first underlying electrode; and
   a second outer electrode extending from the second end surface at least onto the first surface and connected to the multiple second inner electrodes and the second underlying electrode,
each of the first outer electrode and the second outer electrode includes:
   a first portion connected to the multiple first inner electrodes or the multiple second inner electrodes; and
   a second portion connected to one of the first underlying electrode and the second underlying electrode, and
an average particle diameter of metal particles contained in the first portion is smaller than an average particle diameter of metal particles contained in the second portion.
(2) A multilayer electronic component including:
a multilayer body including multiple inner electrodes and multiple dielectric layers alternately stacked, and including a first surface and a second surface opposed to each other in a stacking direction, a first side surface and a second side surface opposed to each other in a longitudinal direction orthogonal to the stacking direction, and a third side surface and a fourth side surface opposed to each other in a width direction orthogonal to the stacking direction and the longitudinal direction;
multiple underlying electrodes; and
multiple outer electrodes, in which
the multiple inner electrodes include:
   multiple first inner electrodes exposed at a first corner portion extending over the first side surface and the third side surface and a second corner portion extending over the second side surface and the fourth side surface; and
   multiple second inner electrodes exposed at a third corner portion extending over the first side surface and the fourth side surface and a fourth corner portion extending over the second side surface and the third side surface,
the multiple underlying electrodes include:
   a first underlying electrode located on the first surface and close to the first corner portion;
   a second underlying electrode located on the first surface and close to the second corner portion;

a third underlying electrode located on the first surface and close to the third corner portion; and a fourth underlying electrode located on the first surface and close to the fourth corner portion, the multiple outer electrodes include:

a first outer electrode extending from the first corner portion at least onto the first surface and connected to the multiple first inner electrodes and the first underlying electrode;

a second outer electrode extending from the second corner portion at least onto the first surface and connected to the multiple first inner electrodes and the second underlying electrode;

a third outer electrode extending from the third corner portion at least onto the first surface and connected to the multiple second inner electrodes and the third underlying electrode; and a fourth outer electrode extending from the fourth corner portion at least onto the first surface and connected to the multiple second inner electrodes and the fourth underlying electrode, each of the first outer electrode, the second outer electrode, the third outer electrode, and the fourth outer electrode includes:

a first portion connected to the multiple first inner electrodes or the multiple second inner electrodes; and a second portion connected to one of the first underlying electrode, the second underlying electrode, the third underlying electrode, and the fourth underlying electrode, and an average particle diameter of metal particles contained in the first portion is smaller than an average particle diameter of metal particles contained in the second portion.

(3) The multilayer electronic component according to (1) or (2) mentioned above, in which the multiple outer electrodes are each composed of a plating layer.

(4) The multilayer electronic component according to any of (1) to (3) mentioned above, in which the multiple inner electrodes contain Ni as a major component, and the multiple outer electrodes contain Cu as a major component.

(5) The multilayer electronic component according to any of (1) to (4) mentioned above, in which an average particle diameter of the metal particles in the first portion, at a position a specified distance away in the longitudinal direction from a surface on the multilayer body side is smaller than an average particle diameter of the metal particles in the second portion, at a position the specified distance away in the stacking direction from a surface on the multilayer body side.

(6) The multilayer electronic component according to any of (1) to (5) mentioned above, in which the average particle diameter of the metal particles contained in the second portion is between 1.1 times and 2.7 times the average particle diameter of the metal particles contained in the first portion, inclusive.

(7) The multilayer electronic component according to any of (1) to (6) mentioned above, in which in the first portion, particle diameter of the metal particles contained in the first portion decreases as distance to the multilayer body decreases.

(8) The multilayer electronic component according to any of (1) to (7) mentioned above, in which in the second portion, particle diameter of the metal particles contained in the second portion increases as distance to the multilayer body decreases.

(9) The multilayer electronic component according to any of (1) to (8) mentioned above, in which an average particle diameter of metal particles contained in the multiple underlying electrodes is larger than an average particle diameter of metal particles contained in the multiple inner electrodes.

(10) The multilayer electronic component according to any one of (1) to (9) mentioned above, in which an average particle diameter of metal particles in each of the multiple underlying electrodes, at a position a specified distance away in the stacking direction from a surface of the underlying electrode opposite to a surface on the multilayer body side is larger than an average particle diameter of metal particles in each of the multiple inner electrodes, at a position the specified distance away in the longitudinal direction from a surface of the multilayer body.

(11) The multilayer electronic component according to any of (1) to (10), in which a dimension in the stacking direction is smaller than a dimension in the longitudinal direction and smaller than a dimension in the width direction.

What is claimed is:

1. A multilayer electronic component comprising:

a multilayer body comprising multiple inner electrodes and multiple dielectric layers alternately stacked, and comprising a first surface and a second surface opposed to each other in a stacking direction and a wall surface facing a specified direction intersecting the stacking direction;

multiple underlying electrodes; and multiple outer electrodes, wherein the multiple outer electrodes comprise a first outer electrode extending from the wall surface at least onto the first surface, the first outer electrode comprises:

a first portion connected to an inner electrode exposed on the wall surface, out of the multiple inner electrodes; and a second portion connected to an underlying electrode located on the first surface, out of the multiple underlying electrodes, and an average particle diameter of metal particles in the first portion, at a position that is a first specified distance away in the specified direction from a surface on a multilayer body side, where the multilayer body is located, is smaller than an average particle diameter of metal particles in the second portion, at a position that is the first specified distance away in the stacking direction from a surface on the multilayer body side.

2. The multilayer electronic component according to claim 1, wherein the first outer electrode is composed of a plating layer.

3. The multilayer electronic component according to claim 1, wherein the inner electrode connected to the first outer electrode contains Ni as a major component, and the first outer electrode contains Cu as a major component.

4. The multilayer electronic component according to claim 1, wherein an average particle diameter of the metal particles contained in the second portion is between 1.1 times and 2.7 times an average particle diameter of the metal particles contained in the first portion, inclusive.

5. The multilayer electronic component according to claim 1, wherein in the first portion, a particle diameter of the metal particles contained in the first portion decreases as distance to the multilayer body decreases.

6. The multilayer electronic component according to claim 1, wherein in the second portion, a particle diameter of the metal particles contained in the second portion increases as distance to the multilayer body decreases.

7. The multilayer electronic component according to claim 1, wherein an average particle diameter of metal particles contained in the underlying electrode connected to the first outer electrode is larger than an average particle diameter of metal particles contained in the inner electrode connected to the first outer electrode.

8. The multilayer electronic component according to claim 1, wherein an average particle diameter of metal particles in the underlying electrode connected to the first outer electrode, at a position a second specified distance away in the stacking direction from a surface of the underlying electrode opposite to a surface on the multilayer body side is larger than an average particle diameter of metal particles in the inner electrode connected to the first outer electrode, at a position the second specified distance away in the specified direction from a surface of the multilayer body.

9. The multilayer electronic component according to claim 1, wherein a dimension in the stacking direction is smaller than a dimension in the specified direction and smaller than a dimension in a width direction intersecting both the stacking direction and the specified direction.

10. The multilayer electronic component according to claim 1, wherein the multilayer body comprises:

a first side surface and a second side surface opposed to each other in a longitudinal direction orthogonal to the stacking direction; and a third side surface and a fourth side surface opposed to each other in a width direction orthogonal to the stacking direction and the longitudinal direction, the multiple inner electrodes comprise:

multiple first inner electrodes exposed at a first corner portion extending over the first side surface and the third side surface and a second corner portion extending over the second side surface and the fourth side surface; and multiple second inner electrodes exposed at a third corner portion extending over the first side surface and the fourth side surface and a fourth corner portion extending over the second side surface and the third side surface, the multiple underlying electrodes comprise:

a first underlying electrode located on the first surface and close to the first corner portion;

a second underlying electrode located on the first surface and close to the second corner portion;

a third underlying electrode located on the first surface and close to the third corner portion; and a fourth underlying electrode located on the first surface and close to the fourth corner portion, the multiple outer electrodes comprise:

the first outer electrode extending from the first corner portion at least onto the first surface and connected to the multiple first inner electrodes and the first underlying electrode;

a second outer electrode extending from the second corner portion at least onto the first surface and connected to the multiple first inner electrodes and the second underlying electrode;

a third outer electrode extending from the third corner portion at least onto the first surface and connected to the multiple second inner electrodes and the third underlying electrode; and a fourth outer electrode extending from the fourth corner portion at least onto the first surface and connected to the multiple second inner electrodes and the fourth underlying electrode, each of the first outer electrode, the second outer electrode, the third outer electrode, and the fourth outer electrode comprises:

the first portion connected to the multiple first inner electrodes or the multiple second inner electrodes; and the second portion connected to one of the first underlying electrode, the second underlying electrode, the third underlying electrode, and the fourth underlying electrode, and an average particle diameter of the metal particles contained in the first portion is smaller than an average particle diameter of the metal particles contained in the second portion.

11. The multilayer electronic component according to claim 1, wherein the multilayer body comprises:

a first end surface and a second end surface opposed to each other in a longitudinal direction orthogonal to the stacking direction; and a first side surface and a second side surface opposed to each other in a width direction orthogonal to the stacking direction and the longitudinal direction, the multiple inner electrodes comprise:

multiple first inner electrodes exposed on the first end surface; and multiple second inner electrodes exposed on the second end surface, the multiple underlying electrodes comprise:

a first underlying electrode located on the first surface and close to the first end surface; and a second underlying electrode located on the first surface and close to the second end surface, the multiple outer electrodes comprise:

the first outer electrode extending from the first end surface at least onto the first surface and connected to the multiple first inner electrodes and the first underlying electrode; and a second outer electrode extending from the second end surface at least onto the first surface and connected to the multiple second inner electrodes and the second underlying electrode, each of the first outer electrode and the second outer electrode comprises:

the first portion connected to the multiple first inner electrodes or the multiple second inner electrodes; and the second portion connected to one of the first underlying electrode and the second underlying electrode, and an average particle diameter of the metal particles contained in the first portion is smaller than an average particle diameter of the metal particles contained in the second portion.

12. The multilayer electronic component according to claim 1, wherein an average particle diameter of the metal particles contained in the first portion is smaller than an average particle diameter of the metal particles contained in the second portion.

13. The multilayer electronic component according to claim 1, wherein the first outer electrode comprises a plurality of metal layers stacked in order from the multilayer body side, and in at least one metal layer selected from the multilayer body side among the plurality of metal layers, an average particle diameter of the metal particles contained in the first portion is smaller than an average particle diameter of the metal particles contained in the second portion.

14. The multilayer electronic component according to claim 1, wherein in a range from the surface on the multilayer body side to the first specified distance, an average particle diameter of the metal particles contained in the first portion is smaller than an average particle diameter of the metal particles contained in the second portion.

15. The multilayer electronic component according to claim 1, wherein in a range of 0.5 μm to 1.5 μm from the surface on multilayer body side, an average particle diameter of the metal particles contained in the first portion is smaller than an average particle diameter of the metal particles contained in the second portion.

16. The multilayer electronic component according to claim 1, wherein the first specified distance is 0.5 μm to 1.5 μm.

* * * * *